US011342964B2

(12) United States Patent
Wurmfeld et al.

(10) Patent No.: US 11,342,964 B2
(45) Date of Patent: May 24, 2022

(54) ARRAY AND METHOD FOR IMPROVED WIRELESS COMMUNICATION

(71) Applicant: Capital One Services, LLC, McLean, VA (US)

(72) Inventors: David Kelly Wurmfeld, Falls Church, VA (US); Jeff Pharr, Herndon, VA (US)

(73) Assignee: Capital One Services, LLC, McLean, VA (US)

(*) Notice: Subject to any disclaimer, the term of this patent is extended or adjusted under 35 U.S.C. 154(b) by 180 days.

(21) Appl. No.: 16/779,765

(22) Filed: Feb. 3, 2020

(65) Prior Publication Data
US 2020/0252106 A1 Aug. 6, 2020

Related U.S. Application Data

(63) Continuation of application No. 16/263,673, filed on Jan. 31, 2019, now Pat. No. 10,594,368.

(51) Int. Cl.
*H04B 5/00* (2006.01)
*H04B 17/336* (2015.01)
*G06F 21/72* (2013.01)

(52) U.S. Cl.
CPC ........... *H04B 5/0087* (2013.01); *G06F 21/72* (2013.01); *H04B 5/0031* (2013.01); *H04B 5/0056* (2013.01); *H04B 5/0081* (2013.01); *H04B 17/336* (2015.01)

(58) Field of Classification Search
CPC .. H04B 5/0087; H04B 5/0081; H04B 17/336; H04B 5/0056; H04B 5/0031; H04B 7/0608; G06F 21/72; H04W 4/023; H04W 4/80
See application file for complete search history.

(56) References Cited

U.S. PATENT DOCUMENTS

| 5,767,807 | A  | * | 6/1998 | Pritchett | .................. | H01Q 3/24 343/834 |
| RE39,982 | E  | * | 1/2008 | Palermo | .................... | H04B 5/06 455/139 |
| 7,672,640 | B2 | * | 3/2010 | Nyshadham | ......... | H01Q 21/062 455/66.1 |

(Continued)

OTHER PUBLICATIONS

Moghimi, M. J., Fernandes, J., Kanhere, A., & Jiang, H. (2015). Micro-Fresnel-zone-plate array on flexible substrate for large field-of-view and focus scanning. Scientific reports, 5, 15861. (11 pages).

*Primary Examiner* — Jinsong Hu
*Assistant Examiner* — Rui M Hu
(74) *Attorney, Agent, or Firm* — Perkins Coie LLP

(57) ABSTRACT

A system for communicating with a wireless device including a base including a front surface; a plurality of communication coils disposed on the front surface and arranged in a matrix, the coils being tuned to a near-field communication frequency; a selector coupled to the coils; at least one memory storing instructions; and at least one processor coupled to the selector and executing the instructions to perform operations. The operations include at least receiving a plurality of feedback signals associated with the coils; identifying a selected one of the coils associated with a strongest one of the feedback signals; and causing the selector to couple the selected coil with a wireless communication module.

18 Claims, 15 Drawing Sheets

(56) References Cited

U.S. PATENT DOCUMENTS

| | | | | |
|---|---|---|---|---|
| 8,159,183 B2* | 4/2012 | Choi | | H02J 50/40 320/108 |
| 8,396,418 B2* | 3/2013 | Dong | | H04B 7/1555 370/492 |
| 8,437,313 B2* | 5/2013 | Salomone | | H04W 48/16 370/332 |
| 9,014,681 B2 | 4/2015 | Nakazawa et al. | | |
| 9,059,505 B1* | 6/2015 | Asrani | | H01Q 9/145 |
| 9,152,832 B2* | 10/2015 | Royston | | H04B 5/0031 |
| 9,270,343 B2* | 2/2016 | Van Lammeren | | H04B 5/0087 |
| 9,276,554 B2 | 3/2016 | Lynch et al. | | |
| 9,306,626 B2* | 4/2016 | Hall | | H04B 5/00 |
| 9,509,418 B2* | 11/2016 | Draaijer | | H04B 7/0805 |
| 9,627,913 B2 | 4/2017 | Maugars | | |
| 9,935,698 B1* | 4/2018 | Yang | | H04B 7/0469 |
| 10,270,298 B1* | 4/2019 | Gupta | | H02J 50/90 |
| 10,855,351 B1* | 12/2020 | Tsai | | H04B 7/063 |
| 2003/0169135 A1* | 9/2003 | Shen | | H01H 50/005 335/78 |
| 2006/0126609 A1* | 6/2006 | Krockel | | H01H 67/22 370/362 |
| 2006/0128308 A1* | 6/2006 | Michael | | H04W 24/00 455/161.1 |
| 2009/0096413 A1* | 4/2009 | Partovi | | H02J 50/40 320/108 |
| 2010/0176934 A1* | 7/2010 | Chou | | H02J 50/23 340/10.34 |
| 2012/0007437 A1* | 1/2012 | Fells | | H02J 50/00 307/104 |
| 2012/0142285 A1* | 6/2012 | Tsuchida | | H04B 7/0691 455/78 |
| 2013/0084801 A1 | 4/2013 | Royston et al. | | |
| 2013/0109379 A1* | 5/2013 | Shi | | H04W 48/16 455/434 |
| 2013/0127254 A1* | 5/2013 | Miichi | | H02J 50/402 307/104 |
| 2014/0091640 A1* | 4/2014 | Scholz | | H01F 38/14 307/104 |
| 2014/0139370 A1* | 5/2014 | Hamner | | G01S 13/4463 342/175 |
| 2014/0354226 A1* | 12/2014 | Draaijer | | H02J 50/05 320/108 |
| 2015/0001289 A1* | 1/2015 | Smith | | G07F 19/20 235/379 |
| 2015/0022009 A1* | 1/2015 | Leabman | | H02J 50/90 307/104 |
| 2015/0054347 A1* | 2/2015 | Amano | | H02J 50/40 307/104 |
| 2015/0118957 A1* | 4/2015 | Schaefer | | H04W 4/80 455/41.1 |
| 2015/0280773 A1* | 10/2015 | Chang | | H04B 1/44 455/78 |
| 2015/0317024 A1* | 11/2015 | Wang | | H04B 5/0056 345/174 |
| 2015/0365138 A1* | 12/2015 | Miller | | H01M 10/425 307/104 |
| 2015/0365877 A1* | 12/2015 | Leather | | H04L 49/101 370/328 |
| 2016/0079766 A1* | 3/2016 | Jeong | | H02J 7/025 307/104 |
| 2016/0086445 A1* | 3/2016 | Tsutsui | | G07F 17/42 463/25 |
| 2016/0171461 A1* | 6/2016 | Hoover | | G07F 19/20 705/43 |
| 2016/0182130 A1* | 6/2016 | Ahmed | | H04B 5/0031 455/41.1 |
| 2016/0218425 A1* | 7/2016 | Mohamadi | | H01Q 21/0031 |
| 2016/0249157 A1* | 8/2016 | Fine | | H04B 5/0031 |
| 2017/0077995 A1* | 3/2017 | Leabman | | H04B 5/0037 |
| 2017/0115511 A1* | 4/2017 | Beaton | | H01Q 1/2208 |
| 2017/0170572 A1* | 6/2017 | Severson | | H01Q 21/0012 |
| 2017/0229774 A1* | 8/2017 | Schuehler | | H04B 7/0617 |
| 2017/0265322 A1* | 9/2017 | Son | | H05K 1/0237 |
| 2017/0308877 A1* | 10/2017 | Cha | | G07F 19/201 |
| 2017/0370883 A1* | 12/2017 | Chin | | G01F 23/2963 |
| 2018/0075436 A1* | 3/2018 | Varvarezis | | G06Q 20/327 |
| 2018/0140946 A1* | 5/2018 | Ueno | | A63F 13/31 |
| 2018/0226367 A1* | 8/2018 | Babcock | | H04B 1/40 |
| 2018/0233954 A1* | 8/2018 | Yang | | H02J 50/12 |
| 2018/0250586 A1 | 9/2018 | Bellingham et al. | | |
| 2019/0312452 A1* | 10/2019 | Chen | | H02J 50/10 |
| 2020/0178054 A1* | 6/2020 | Simileysky | | H04B 17/336 |
| 2020/0220572 A1* | 7/2020 | Kwon | | H01Q 21/0025 |
| 2021/0013608 A1* | 1/2021 | Takayama | | H01Q 21/065 |

* cited by examiner

ARRAY AND METHOD FOR IMPROVED WIRELESS COMMUNICATION

CROSS-REFERENCE TO RELATED APPLICATIONS

This application is a continuation of U.S. application Ser. No. 16/263,673, filed Jan. 31, 2019, the contents of which are hereby expressly incorporated herein in their entirety.

TECHNICAL FIELD

The present disclosure relates generally to an apparatus for improved wireless communication, and more particularly, to a matrix of near-field communication coils operable to improve near-field communication channels.

BACKGROUND

Wireless communication protocols are increasingly used in industrial, commercial, and consumer applications. For example, near-field communication (NFC) is a type of wireless communication that connects electronic devices when they are in close proximity; normally within 10 cm. NFC involves an 'initiator' that generates a radio frequency (RF) field to power a passive 'target' via electromagnetic induction. Once the target is powered, the initiator is able to request information from the target and perform transactions.

NFC's short-range and ability to power a passive target make NFC advantageous for certain applications. For example, NFC can be used when it is desirable to communicate wirelessly with small unpowered devices. Because the initiator may provide power to the target, NFC targets can have very simple forms, such as unpowered tags, stickers, key fobs, or cards. Moreover, NFC can be used to exchange sensitive and personal information, such as credit or debit card information. Because NFC only operates in short-ranges, NFC prevents man-in-the-middle or similar spoofing attacks. Therefore, NFC does not require authentication steps and demands only simple hardware, providing quick and simple wireless communication. These advantages make NFC a good candidate for contactless applications, such as contactless payment and contactless identification.

While NFC has important advantages, it also has drawbacks that have discouraged user adoption. NFC users complain that NFC may be unreliable, reporting that NFC channels are difficult to establish and often slow. For example, NFC users report they must wait several seconds before an NFC connection between the initiator terminal and their target devices is established. Also, NFC users report that they have to reposition their devices multiple times before the NFC connection is successful, making a transaction that is normally fast unnecessarily cumbersome. In addition, NFC users report that many times after establishing connection, the NFC communication is nonetheless unsuccessful and they must restart the communication process. These reliability issues frustrate users of contactless payment and contactless identification methods, who may then return to traditional non-NFC identification or payment methods to avoid these issues.

Underlying many of these NFC's reliability issues are NFC's requirements of close proximity and tight alignment between the initiator and the target. To have successful and reliable communication, NFC requires that the initiator and the target be within a few centimeters and be precisely aligned. Specifically, NFC coils of the initiator and target should be close and aligned. Without such proper alignment, the energy transfer required to power the target device may be insufficient and/or the communication signals may be obfuscated by noise sources. Indeed, poor alignment between the initiator and target can be catastrophic for the communication because small position or orientation differences can reduce the intensity of RF signals by orders of magnitude. In addition, aligning coils of target device and initiator terminal can be difficult because in many target devices the inductive coil only covers a specific area of the target. For example, while some smartphones have coils covering the full smartphone case, other smartphones have the NFC coil only in a portion of case. Similarly, some credit cards have small coils located only in a specific portion of the card. These variations in the position of coils within the target devices exacerbate misalignment issues because users are forced to attempt multiple orientations of the device before the NFC link can be established.

The disclosed apparatus and methods for wireless communication address one or more of the problems set forth above and/or other problems in the prior art.

SUMMARY

One aspect of the present disclosure is directed to a system for communicating with a wireless device. The system may include a base including a front surface; a plurality of communication coils disposed on the front surface and arranged in a matrix, the coils being tuned to a near-field communication frequency; a selector coupled to the coils; at least one memory storing instructions; and at least one processor coupled to the selector. The processor may execute the instructions to perform operations including: receiving a plurality of feedback signals associated with the coils; identifying a selected one of the coils associated with a strongest one of the feedback signals; and causing the selector to couple the selected coil with a wireless communication module.

Another aspect of the present disclosure is directed to an apparatus for wireless communication. The apparatus may include a base including a front surface; a plurality of communication coils (disposed parallel to the front surface; arranged in a matrix; and tuned to a near-field communication frequency); a selector coupled to each of the coils; at least one memory storing instructions; and a processor coupled to the selector. The process may execute the instructions to perform operations including: receiving a plurality of feedback signals associated with the coils; identifying a selected one of the coils associated with a strongest one of the feedback signals; and causing the selector to couple the selected coil with a wireless communication module.

Yet another aspect of the present disclosure is directed to a method of communication with a wireless device. The method may include receiving a plurality of feedback signals associated with a plurality of communication coils, the coils being arranged in a matrix on a base and being tuned to a near-field communication frequency; identifying a selected one of the coils associated with a strongest one of the feedback signals; causing a selector coupled to the coils to connect a wireless communication module with the selected coil; and initiating wireless communications with the wireless device using the selected coil.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
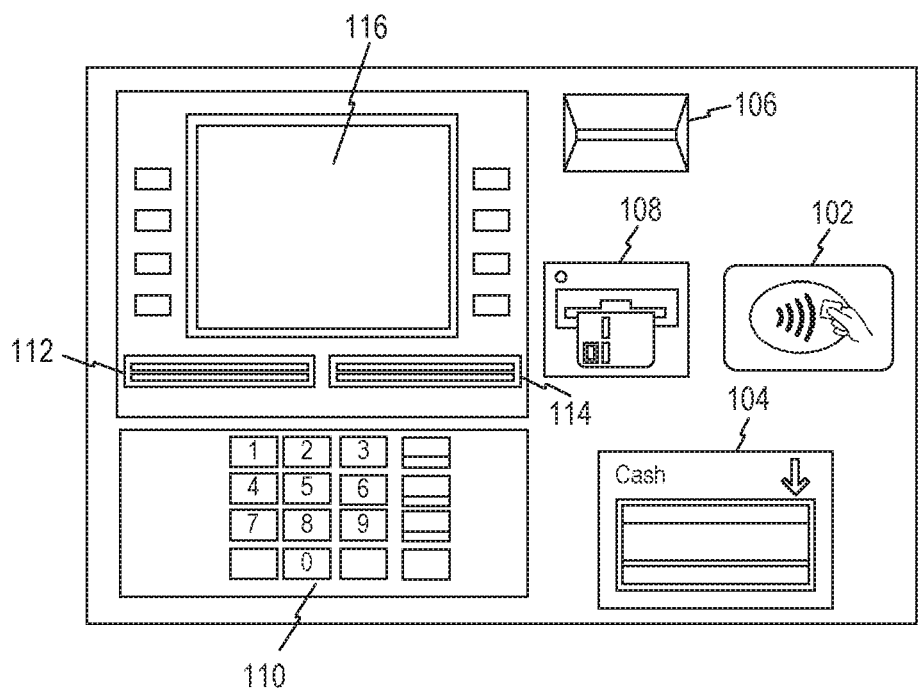
FIG. 1 is a front view of an exemplary automated teller machine consistent with disclosed embodiments.

The disclosure is generally directed to a system including a communication matrix employing multiple NFC coils operable to improve the reliability of NFC communications. Distributing multiple coils across an area may facilitate establishing a link between an NFC target and the NFC initiator because distributed coils cover a larger area. The coils in the matrix will direct an RF field to a broad area of potential target locations, simplifying the identification of NFC targets in close proximity and more efficiently initiating communications. The coils may be connected to other communication circuitry using a selector or switching devices that may identify the coil with a strongest link by scanning feedback signals. The feedback signals may be received from the NFC coils themselves or from receivers that detect signals in different frequencies. With this arrangement, the disclosed communication matrix minimize required repositioning of a target device when attempting to establish NFC communication because the array improves the chances of finding a coil that is close and aligned to the target, without forcing a user to reposition the target. For example, while traditional NFC initiators with a single coil may require that users move the target device until the device is in close proximity, the disclosed NFC coil arrangement with multiple coils covering a larger area may more easily initiate communication from the target's initial location. Moreover, the communication matrix may include coils of various shapes and sizes to provide a wider variety of options for selection of the best link.

Furthermore, the communication matrix may be operated with a processor that performs a scanning method to assess the proximity of each coil with respect to the target. The scanning method may use NFC frequencies to attempt to get a response. However, the scanning method may also use non-NFC receivers to identify a closest coil. Many NFC-enabled devices broadcast signals in different frequencies from NFC. For example smartphones normally broadcast WiFi signals and smartwatches normally broadcast Bluetooth signals. Then, each one of NFC coils in the matrix may be associated with a receiver of non-NFC frequencies that is close to the corresponding coil. A processor operating the communication matrix may sequentially query the receivers to gather feedback signals and identify a coil that is closer to the target. This scanning process may quickly identify the closest coil to the target based on the broadcasted non-NFC frequencies because the scanning process may provide the ability to identify the coil that is closest to the target by associating the intensity of a signal in a different frequency with greater range. Once a coil that is closest to the target is identified, the processor may configure the selector to connect the closest coil with communication modules and establish the NFC channel. In addition, in some embodiments the scanning method may identify multiple coils in the communication matrix that may be used simultaneously to improve the communication. The scanning method in conjunction with the communication matrix may facilitate finding a coil in proximity with the target quickly to enhance the reliability of NFC communications.

Reference will now be made in detail to the disclosed embodiments, examples of which are illustrated in the accompanying drawings.

FIG. 1 shows an exemplary automated teller machine (ATM) 100 consistent with disclosed embodiments. ATM 100 may include a receipt printer 106, a card reader slot 108, and a cash dispenser 104. ATM 100 may also include speakers 112 and 114, a keyboard 110, and a graphical user interface or display 116. In addition, ATM 100 may include an NFC area 102, which may include a graphical icon associated with NFC communication. In addition, although not shown in FIG. 1, ATM 100 may include a CPU (to control the user interface and transaction devices), a secure cryptoprocessor, generally within a secure enclosure, function key buttons (usually close to the display) or a touchscreen (used to select the various aspects of the transaction), a vault (to store the parts of the machinery requiring restricted access), and a plurality of sensors and indicators, such as proximity sensors.

In some embodiments, ATM 100 may be configured to grant access to an account when a user is identified from a card entered in card slot 108 or when a user places an NFC target (such as a smartphone, a smartwatch, or a card) close to NFC area 102.

Figure 2:
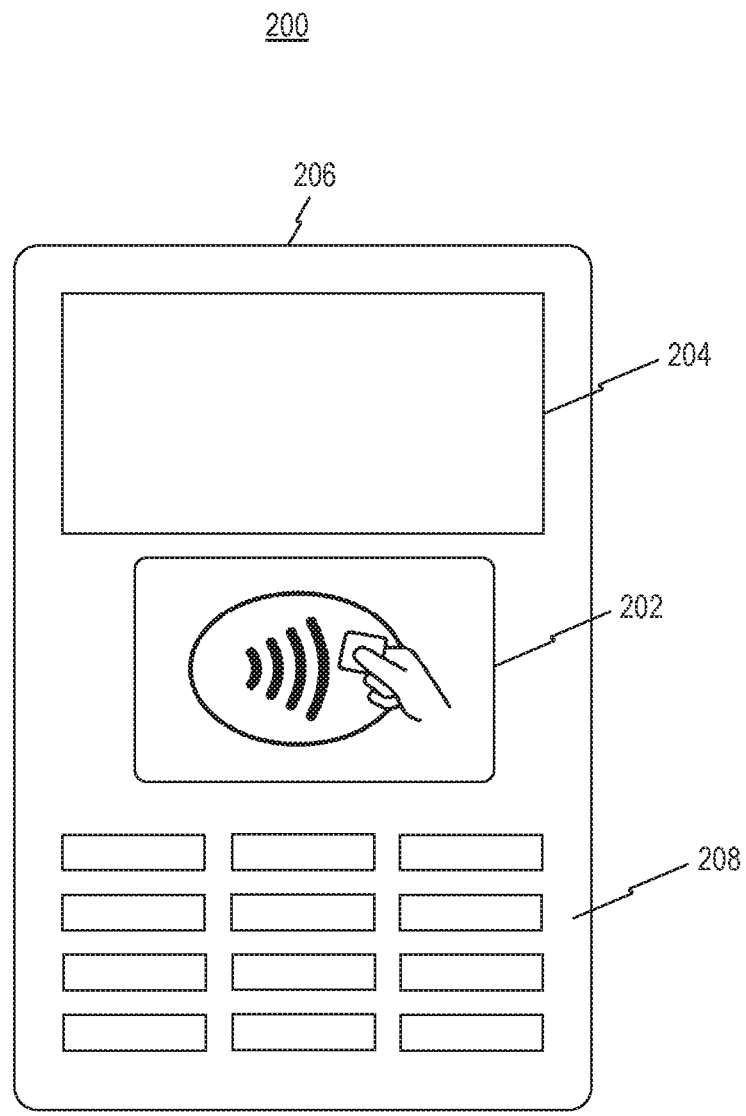
FIG. 2 is a front view of a payment terminal consistent with disclosed embodiments.

FIG. 2 shows a payment terminal 200 consistent with disclosed embodiments. Payment terminal 200 may include a display 204, a housing 206, and a keyboard 208. In addition, payment terminal 200 may include an NFC area 202. Payment terminal 200 may transmit data over a standard telephone line, an internet connection, or other communication channel. Moreover, payment terminal 200 may have the ability to cache transactional data to be transmitted to the gateway processor when a connection becomes available. In some embodiments, payment terminal 200 may include receivers and transmitters for Bluetooth, Wi-Fi, cellular, or even satellite networks.

In some embodiments, display 204 may include a touch screen and a merchant may replace the functionality of dedicated credit card terminal hardware using a terminal application running on a PC or mobile device, such as a smartphone. For example, a merchant may adapt a smartphone with a dedicated hardware reader that can transfer magnetic stripe data to the application. In addition, payment terminal 200 may accommodate REID technology. Additionally, payment terminal 200 may execute software allowing end to end card data encryption.

Moreover, payment terminal 200 may be configured to communicate with an NFC-enabled device when the device is placed close the NFC area 202. In such embodiments, payment terminal 200 may authenticate an NFC target placed in proximity to NFC area 202. Then, based on the authentication, payment terminal 200 may communicate with a financial service provider to determine if a transaction may be performed.

Figure 3:
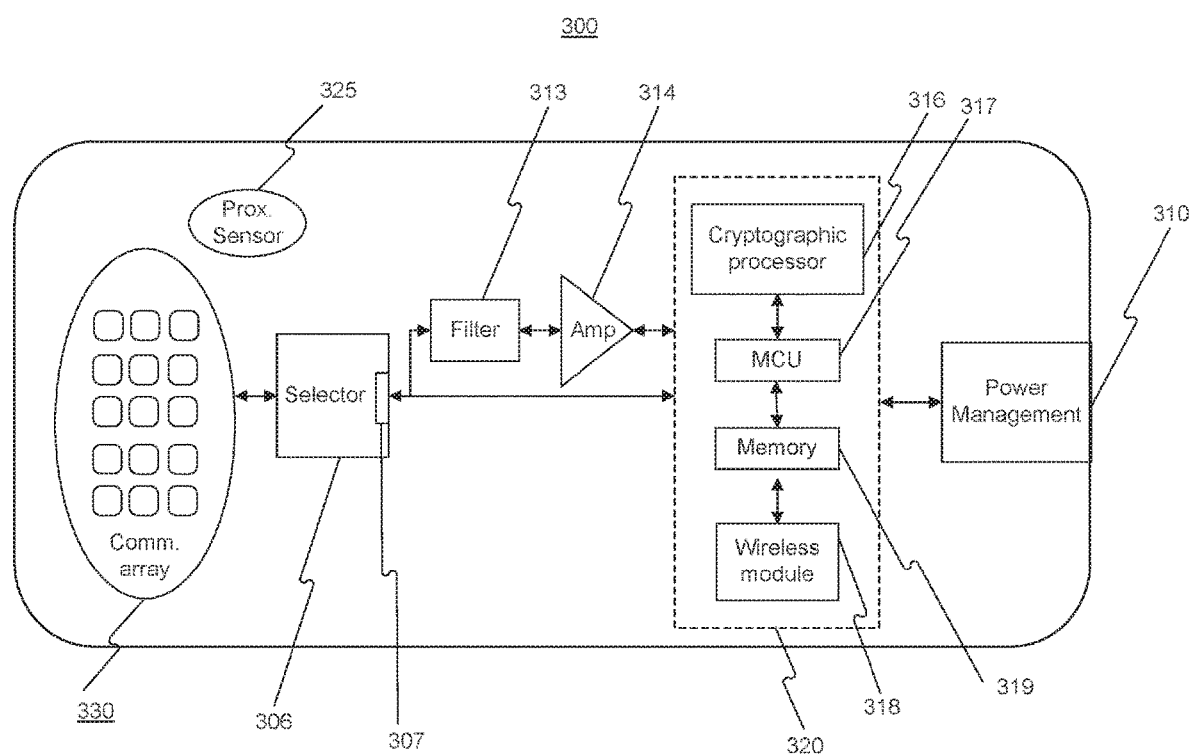
FIG. 3 is a block diagram of a wireless communication system consistent with disclosed embodiments.

FIG. 3 is a block diagram of an exemplary wireless communication system 300 consistent with disclosed embodiments. In some embodiments, wireless communication system 300 may be configured as a wireless subsystem that provide wireless communication capabilities. For example, wireless communication system 300 may be part of ATM 100 and be located behind or nearby NFC area 102. In such embodiments wireless communication system 300 may be coupled to, and controlled by, a central processing unit of ATM 100. In other embodiments, wireless communication system 300 may be part of payment terminal 200 and be located behind or nearby NFC area 202. In such embodiments wireless communication system 300 may be coupled to, and controlled by, a central processing unit of payment terminal 200.

Wireless communication system 300 may include a processor 320 coupled to a power management module 310, and to a communication matrix 330 via a selector 306. The processor may include a cryptographic coprocessor 316, a microcontroller unit 317, a wireless communication module 318, and a memory unit 319. In addition, wireless communication system 300 may include a filter 313, an amplifier 314, and a proximity sensor 325. Elements of wireless communication system 300 may be electrically coupled as indicated by arrows in FIG. 1. For example, selector 306 may be connected to processor 320 via filter 313 and amplified 114. However, connections other than those presented in FIG. 1 are possible. For example, instead of being connected directly to power management 310, processor 320 may be connected to power management 310 through filter 313.

Communication matrix 330 may include switches, a plurality of coils, and/or antennas to receive and transmit RF signals. In some embodiments, communication matrix 330 may be an initiator of NFC communication and be located behind or nearby NFC area 102 or NFC area 202. In such embodiments, communication matrix 330 may be configured to generate RF signals that activate an NFC target and then receive RF signals. For example, communication matrix 330 may include a plurality of loop coils or antennas with an electronic switch (or capacitive sensor) in series, and may also include other types of wireless communication. Additionally, communication matrix 330 may include modules for other RFID standards specifying proprietary data formats in a closed-loop system.

Communication matrix 330 may also include a plurality of receivers configured to detect non-NFC frequencies. For example, communication matrix 330 may include receivers to detect RFID Radio frequency identification. In yet other embodiments, communication matrix 330 may include receivers for BLE (Bluetooth Low-Energy) signals, WiFi signals, cellular signals and/or Beacon signals. In such embodiments, communication matrix 330 may use signals from these standard wireless protocols, used in many portable devices, to identify a coil that can best couple to the NFC target. In yet other embodiments, receivers in communication matrix 330 may include ZigBee, Z-Wave and/or LiFi, Ultrasonic, or Chirpcast detectors. Components and configuration of communication matrix 330 are further described in connection with FIGS. 4-6.

Selector 306 may be a switching device coupled to and connecting elements of communication matrix 330. In some embodiments, selector 306 may be implemented as a row and column selector that addresses each one of the coils and/or receivers in communication matrix 330. In such embodiments, selector 306 may include digital circuitry to control row and column multiplexers and connect one of the coils in communication matrix 330 with an output. Additionally, or alternatively, selector 306 may include transistors, or other solid state switch, connected in series with each one of the coils to connect them to a data bus. In other embodiments, selector 306 may be implemented as an electrical and/or electromechanical relay switch. In yet other embodiments selector 306 may be implemented with de-multiplexors or programmable logic devices (PLD) that select one of multiple signals to transmit. In other embodiments, selector 306 may be implemented with arrangements of PMOS or NMOS transistors, as well as other types of solid state switches (such as BJT transistors or a controlled avalanche diodes) configured to connect antennas and/or coils of communication matrix 330. In alternative embodiments, selector 306 may be implemented as a non-solid state switch, such as a magnetic switch or miniature vacuum tube.

In some embodiments, selector 306 may include a selector input 307 that receives a signal to control the status of selector 306. In such embodiments, selector 306 may be connected to processor 320, which may transmit instructions to selector 306 to connect one or more coils of communication matrix 330. For example, if selector 306 is implemented with row and column multiplexers, the row and column circuitry may be coupled to processor 320, which may apply control signals across the input terminals of the row/column circuit. Alternatively, if selector 306 includes an electromechanical relay, processor 320 may apply a control signal that energizes a coil in selector 306 to modify the configuration of selector 306 and connect one or more of the coils in communication matrix 330. In addition, in embodiments in which selector 306 is implemented with digital multiplexers, selector 306 may be coupled with processor 320 with a digital bus and receive and process digital instructions to set the desired connections to communication matrix 330.

In some embodiments, an output of selector 306 may also be coupled to processor 320. For example, output terminals of the row and column circuit used to implement selector 306 may be coupled with processor 320. Alternatively, the output terminals of multiplexers or de-multiplexers used for selector 306 may be connected to processor 320. With such configuration, processor 320 may get coupled with selected coils and/or antennas in communication matrix 330 by applying a control signal that connects selected coils and then receiving signals from the output of selector 306.

To facilitate data processing during NFC exchanges, signals from selector 306 may be processed by filter 313 and amplifier 314. Filter 313 may include analog or digital circuitry to perform low-pass or band-pass filtering operations. For example, to remove noise from the wireless device circuitry or frequencies used by receivers to determine the closest coil to the target, signals from communication matrix 330 and selector 306 may be filtered to eliminate low-frequency signals that are not used in the wireless communication. In such embodiments, filter 313 may be a resistance-capacitance RC filter, a resistance-inductance (RL) filter, a second-order filter, or a high-order filter with a combination of electronic components. However, in other embodiments, filter 313 may include a digital filter which first digitizes the signal from communication matrix 330 and then filters it using a data processing technique such a Fast Fourier Transform (FFT). For example, filter 313 may include an analog-to-digital converter coupled with at least one of Bessel filters, Butterworth filters, or Savitzky-Golay filters, among other configurable digital filters.

Amplifier 314 may include digital or analog amplifiers. For example, amplifier 314 may include operational amplifiers configured with a controlled feedback through an external circuit that is coupled to processor 320. In such embodiments, amplifier 314 may include an integrated amplifier circuit and/or discrete transistor circuits. In other embodiments, amplifier 314 may include a fully differential amplifier constructed using BJTs or FETs. Alternatively, or additionally, amplifier 314 may include one or more stages having summed outputs. In such embodiments, the gain of each stage may add linearly to the output rather than multiplies one on the other as in a cascade configuration. This embodiments may achieve a higher bandwidth to be achieved than could otherwise be realized even with the same gain stage elements.

In other embodiments, amplifier 314 may be implemented with a digital amplifier. For example, amplifier 314 may be a digital circuit that receives a digital input from selector 306 or communication and converts the signal to a Pulse Width Modulation (PWM) format. In such embodiments, amplifier 314 may produce a high voltage signal which replicating the original signal from selector 306 or communication matrix 330.

In some embodiments, processor 320 may be a single device providing the functionality of cryptographic coprocessor 316, microcontroller unit (MCU 317), wireless module 318, and memory unit 319. However, in other embodiments, processor 320 may be a collection of individual devices.

Cryptographic coprocessor 316 may include a secure crypto-processor chip or a microprocessor dedicated to carrying out cryptographic operations, embedded in a packaging with multiple physical security measures. Such measures may give cryptographic coprocessor 316 a degree of tamper resistance. In some embodiments, cryptographic coprocessor 316 may be configured to host contactless applets and output decrypted data onto a bus in a secure environment. Cryptographic coprocessor 316 may not output decrypted data or decrypted program instructions in an environment where security cannot always be maintained.

In some embodiments, cryptographic coprocessor 316 may be configured to perform operations including tamper-detecting and tamper-evident containment. In such embodiments cryptographic coprocessor 316 may include conductive shield layers in the chip that prevent reading of internal signals, controlled execution to prevent timing delays from revealing any secret information, and/or automatic zeroization of stored data in the event of tampering. Moreover, cryptographic coprocessor 316 may be configured with chain-of-trust boot loader and/or a chain-of-trust operating system which authenticates an operating system before loading it. Cryptographic coprocessor 316 may also include hardware-based capability registers, implementing a one-way privilege separation model.

In other embodiments, cryptographic coprocessor 316 may be optimized for public key operations targeting network infrastructure across the enterprise and the data center. These operations may execute public key algorithms such as RSA, Diffie Hellman, and Elliptic Curve Cryptography (ECC), forming the basis of digital signature and key exchange protocols to make secure transactions possible. By providing public key acceleration, the cryptographic coprocessor 316 may enable networks to efficiently handle SSL and IPsec traffic that requires public key. However, cryptographic coprocessor 316 may also accelerate bulk encryption.

MCU 317 may include a microcontroller or a system on a chip such as an Arduino. Alternatively, MCU 317 may include one or more known processing devices, such as microprocessors manufactured by Intel™ or AMD™ or licensed by ARM. MCU 317 may constitute a single core or multiple core processors that executes parallel processes simultaneously. For example, MCU 317 may be a single core processor configured with virtual processing technologies. In certain embodiments, MCU 317 may use logical processors to simultaneously execute and control multiple processes. In some embodiments, MCU 317 may implement virtual machine technologies, or other known technologies to provide the ability to execute, control, run, manipulate, store, etc. multiple software processes, applications, programs, etc. In another embodiment, MCU 317 may include a multiple-core processor arrangement (e.g., dual, quad core, etc.) configured to provide parallel processing functionalities to allow wireless communication system 300 to execute multiple processes simultaneously. For example, MCU 317 may be configured to process multiple input signals from communication matrix 330 simultaneously. Other types of processor arrangements could be implemented that provide for the capabilities disclosed herein.

Wireless module 318 may include a processor that generates and process near-field communication (NFC) signals to communicate with an NFC device such as a smart phone, a smart watch, or a credit card. For example, wireless module 318 may include a module that generates signals that may be transmitted by communication matrix 330 to power an NFC target and then transmit communication instructions. Wireless module 318 may also configured to process NFC signals received through coils of communication matrix 330. Wireless module 318 may be custom-encoded by the manufacturers or use NFC Forum specifications. Moreover, wireless module 318 may be configured to receive personal data such as debit and credit card information, loyalty program data, PINs and networking contacts, among other information. Wireless module 318 may include radio frequency circuitry to generate excitation and communication signals. In some embodiments, wireless module 318 may operate within the globally available and unlicensed radio frequency ISM band of 13.56 MHz.

Memory unit 319 may include a volatile or non-volatile, magnetic, semiconductor, solid-state, tape, optical, removable, non-removable, or other type of storage device or tangible (i.e., non-transitory) computer-readable medium that stores programs and data. Data stored in memory unit 319 may include, for example, history of feedback signals received from communication matrix 330, selected coils, and identification information. In some embodiments, memory unit 319 may include one or more rule sets for prioritizing the selection of coils for NFC communications.

Power management module 310 may include circuitry and processing units that monitor and control power sources that feed wireless communication system 300. Power management 310 module may include one or more forms of electronic power conversion and/or relevant power control functions. In some embodiments, power management module 310 may include a local power source, such as a battery. However, in other embodiments power management module 310 may only be coupled to an external power source.

Proximity sensor 325 may include an electronic sensor with the ability to detect the presence of nearby objects or people without any need of physical contact. Proximity sensor 325 may emit an electromagnetic field or a beam of electromagnetic radiation (infrared, for instance), and look for changes in the field or a return signal. Proximity sensor 325 may be implemented with different sensor technologies including, for example, a capacitive proximity sensor, photoelectric sensor, and/or an inductive proximity sensor. In some embodiments, in which wireless communication system 300 is configured to operate with minimum power consumption, proximity sensor 325 may be adjusted to a very short range to limit the engagement of wireless communication system 300 for only attempts of NFC communication. In other embodiments, proximity sensor 325 may be separated from the rest of components of wireless communication system 300. For example, when wireless communication system 300 is part of ATM 100, proximity sensor 325 may be placed in an entrance door to ATM 100 room, or in the proximity of the keyboard 110. Alternatively, proximity sensor 325 may be located on top of display 116 or close to NFC area 102. In embodiments in which wireless communication system 300 is part of payment terminal 200, proximity sensor 325 may be located on top of display 204 and/or nearby keyboard 208.

Figure 4A:
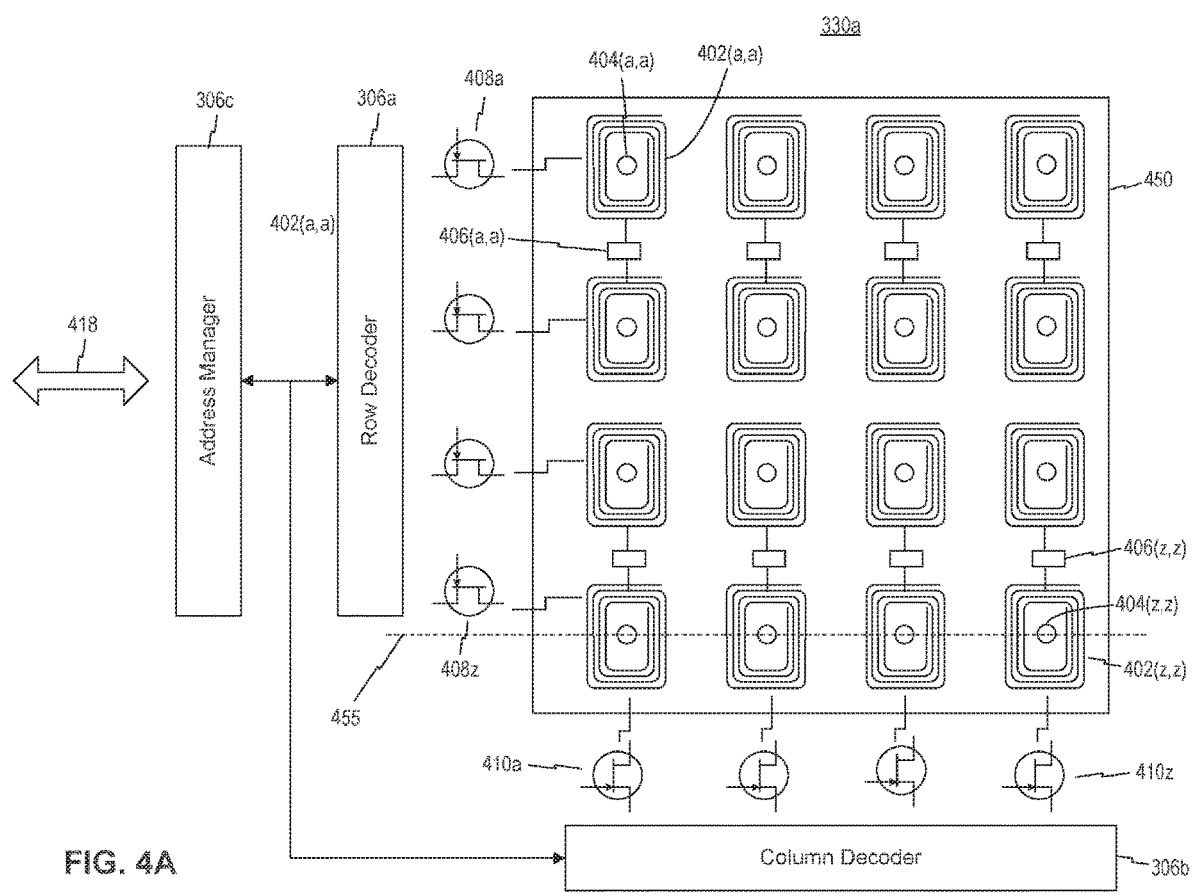
FIG. 4A is a top view of a communication matrix consistent with disclosed embodiments.

FIG. 4A is a top view of a communication matrix 330a consistent with disclosed embodiments. In some embodiments, communication matrix 330 of wireless communication system 300 may be implemented with communication matrix 330a.

Communication matrix 330a may include a substrate 450 with a plurality of coils 402(a,a)-402(z,z). Each one of the coils 402 may be associated with at least one of receivers 404(a,a)-404(z,z) disposed on substrate 450. In addition, substrate 450 may include a plurality of local switches 406(a,a)-406 (z,z) connecting two or more coils 402. Literals used to reference individual elements in FIG. 4, e.g., (a,a), (a,z), or (z,z), do not specify the number of an element or the total number of elements in communication matrix. Instead, they are variable references that indicate a variable element number and a variable number of total elements. For example, literal (z,z) used to reference coil 402(z,z) does not indicate that coil 402(z,z) is in the 26, 26 position of the array. Instead, (z,z) is a variable reference that could indicate any integer number pair that indicate the position of the individual element. Therefore, coil 402(z,z) is any one of coils 402 and the number of coils 402 in communication matrix 330a is any integer. Similarly, literals (a,a) and (a,z) used to reference, for example, other coils 402 or receivers 404 are also variable references that do not indicate or limit the element number or the total number of elements.

In some embodiments, as shown in FIG. 4A, coils 402, receivers 404, and local switches 406 may be disposed on a single substrate 450. In such embodiments, substrate 450 may be a printed circuit board (PCB) and may be located behind or nearby NFC area 102. Because substrate 450 may have coils 402 for NFC, substrate 450 may be covered by the NFC graphical icon of ATM 100 and/or payment terminal 200. In other embodiments, substrate 450 may be sectioned in multiple pieces. For example, when wireless communication system 300 is part of ATM 100, substrate 450 may be divided on multiple pieces having a first piece nearby to NFC area 102, a second piece nearby keyboard 110, and a third piece nearby display 116. Similar arrangements of divided substrate 450 are also possible. Indeed, in some embodiments each coil 402 may have a unique piece of substrate 450. Accordingly, substrate 450 may be a multiple piece substrate arranged in, for example, the exterior surface of ATM 100 or housing 206 of payment terminal 200. In alternative embodiments, substrate 450 may include a flexible substrate.

In some embodiments, as shown in FIG. 4A, coils 402 may include a plurality of rectangular loop coils tuned for NFC frequencies around 13.56 MHz. In such embodiments, coils 402 may have uniform dimensions and be fabricated with similar materials. In other embodiments, coils 402 may include coils with a plurality of shapes and sizes. With multiple sizes and shapes, coils 402 may be able to provide a variety of RE fields that may better march the target device and improve NFC links.

Moreover, in some embodiments coils 402 may form a square matrix with an equal number of rows and columns. However, in other embodiments, the matrix dimensions may be different, having a greater number of rows than columns or vice versa.

Receivers 404 may include receivers for RFID, BLE, Beacons, WiFi, ZigBee, Z-Wave and/or LiFi, Ultrasonic, Chirpcast or other communication signals. Moreover, receivers 404 may include sensors to sense cellular signal intensity or infra-red (IR) signal intensity. In some embodiments, receivers 404 may be miniature receivers for the signals. For example receivers 404 may include micro-sized WiFi adapters, micro BLE receivers, micro IR receivers, and/or RF signal meters tuned for cellular frequencies. Additionally, receivers 404 may include receivers for multiple frequencies. For example, receivers 404 may include an IoT HAT for Raspberry Pi to detect WiFi and BLE signals.

Local switches 406 may include mechanical or solid state switches that connect two or more coils 402. For example, local switches 406 may include a plurality of miniature relays that connect coils 402 to function as a single coil with an extended area. Alternatively, or additionally, local switches 406 may include solid state switches, such as PMOS transistors, to selectively connect two or more coils 402. In some embodiments, local switches 406 may include multiple types of switches that can be disposed on substrate 450 having, for example, local switch 406(a,a) being different from local switch 406 (z,z).

In some embodiments, as shown in FIG. 4A each one of receivers 404 may be located in an inner loop of a corresponding coils 402. Then, signals captured by receivers 404 may be easily correlated with at least one of coils 402. For example, when it is determined that receiver 404(a,a) has the strongest feedback signal, processor 320 may easily identify coil 402(a,a) as the coil that is closest with the target NFC device. In other embodiments, receivers 404 may be close but not in the middle of coils 402. For example, receivers 404 may be on the side of corresponding coils 402.

FIG. 4A shows that communication matrix 330a may include elements for row and column addressing of coils 402 and receivers 404. Thus, in some embodiments, selector 306 may be incorporated in communication matrix 330a. For example, communication matrix 330a may include a plurality of row transistors 408 for addressing rows of coils 402 and a plurality of column transistors 410 for addressing columns of coils 402. In addition, communication matrix 330a may include a row decoder 306a and a column decoder 306b to establish electrical connections between elements of communication matrix 330a and external elements. For example, decoders in communication matrix 330a may connect each one of coils 402 with processor 320, filter 313, and/or wireless module 318. Row decoder 306a may operate with analog or digital methods, or partially analog and partially digital methods. Row decoder 306a may include one or more multiplexers and be directly connected to an address manager 306c. Similarly, column decoder 306b may include analog or digital switches and/or multiplexers to establish electrical communication with a plurality coil 402 lines to read data from, or transmit signals to, the coils 402. Row decoder 306a and column decoder 306b may also include amplifiers to drive voltages or currents during read and transmission operations. For example, column decoder 306b may include sensing amplifiers and RF amplifiers.

In some embodiments, column decoder 306b and/or row decoder 306a may include coaxial contacts designed to avoid reflectance of RF power back toward the source. The coupling junctions between the coils and decoders may have a change in impedance that reflect RF signals and diminish the signal's quality. For example, the reflection coefficient between the coil and the decoders reflect RF power because there is an impedance discontinuity in the transmission medium. To avoid signal degradation caused by the reflection, decoders may be coupled to the coils with a transition impedance that limits the impedance differentials to maximize transmission efficiency.

Moreover, to control row and column addressing, communication matrix 330a may include address manager 306c coupled to row decoder 306a and column decoder 306b. Address manager 306c may include digital circuits that manages the flow of signals and data from and to coils 402 and receivers 404. In some embodiments, address manager 306c may be assembled with a microcontroller or a processing unit. Moreover, address manager 306c may provide means for selecting one of coils 402 based on a measured feedback signal. In addition, address manager 306c may communicate with other components of wireless communication system 300 through data bus 418. For example, address manager 306c may interface coils and processor 320. Alternatively, address manager 306c may communicate and configured with selector 306 to establish direct communication between coils 402 and wireless module 118.

Figure 4B:
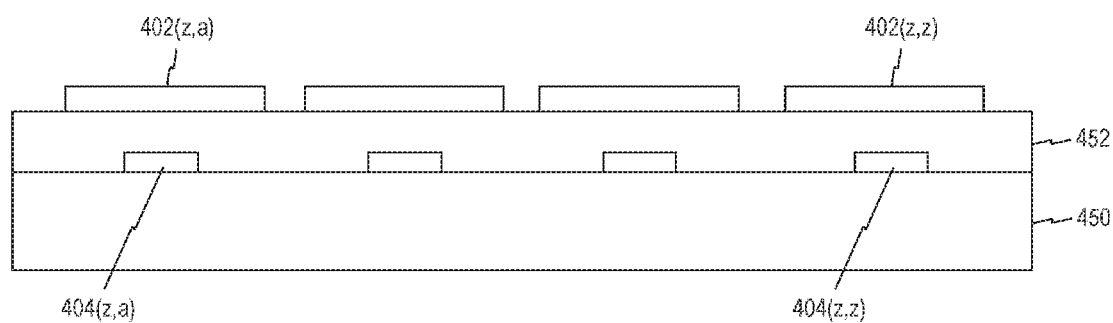
FIG. 4B is a cross-sectional view of a first exemplary embodiment of the communication matrix of FIG. 4A.
Figure 4C:
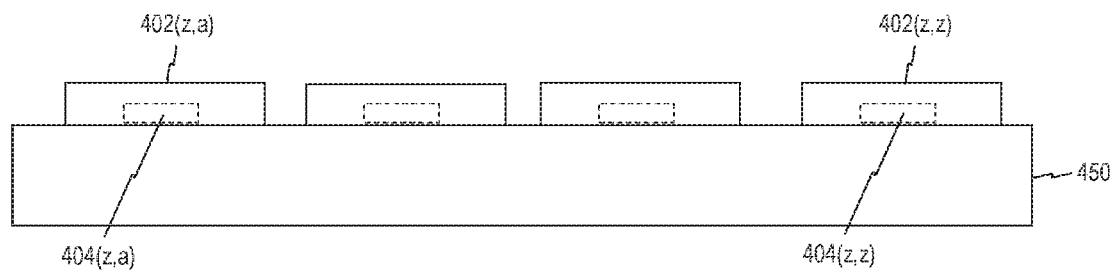
FIG. 4C is a cross-sectional view of a second exemplary embodiment of the communication matrix of FIG. 4A.

FIGS. 4B and 4C are cross-sectional views of different embodiments of communication matrix 330a, taken along dashed line 455 of FIG. 4A. Therefore, FIGS. 4B and 4C show the cross section of four coils 402, four respective receivers 404, and substrate 450.

In the embodiment of communication matrix 330a shown in FIG. 4B, coils 402 and receivers 404 may be in different planes of substrate 450. While coils 402 may be in the upper layer of substrate 450 (closest to the possible regions where a user ay place the NFC target), receivers 404 may be in a lower layer. With this arrangement coils 402, which are designed for NFC communication, may be closer to a target NFC device while receivers 404, which are designed for non NFC-communication that have a greater range, may be positioned further away from the target device.

In some embodiments, receivers 404 may be embedded in an insulative layer 452 that is over substrate 450. Insulative layer 452 may include a polymeric layer, such as polyethylene terephthalate (PET), polyethylene-naphthalate (PEN), polyimide (PI). In other embodiments, insulative layer 452 may be formed with glass-like materials such as silica. In yet other embodiments, insulative layer 452 may be formed with spin-coat insulators. Insulative layer 452 may have a thickness of only a few millimeters or even a couple hundred microns, as long as electrical contact between coils 402 and respective receivers 404 is prevented.

In some embodiments, coils 402 may be on lop of insulative layer 452 and aligned over respective receivers 404. In other embodiments, coils 402 may be also covered by a portion of insulative layer. Using insulative layer 452 for communication matrix 330a may minimize the footprint of substrate 450 while allowing the use of various coils 402, even coils that have small inner loops.

FIG. 4C is a cross-sectional of an alternative embodiment of communication matrix 330a consistent with disclosed embodiments. In the embodiment of FIG. 4C, instead of having insulative layer 452 to create one level for receivers 404 and a different level for coils 402, receivers 404 and coils 402 may be at the same level on substrate 450. For example, receivers 404 may be on the same level and inside an inner loop of coils 402. The configuration shown in FIG. 4C of receivers 404 and coils 402 may facilitate fabrication of communication matrix 330a and the correlation between feedback signals captured with receivers 404 and a corresponding coil 402. Moreover, the configuration shown in FIG. 4C does not require insulative layer 452 reducing fabrication costs. However, with this configuration the size of coils 402 is restricted to coils that have inner loops with an area greater than the size of corresponding receivers 404. Therefore, receivers 404 used in FIG. 4C may be miniaturized receivers.

Figure 5A:
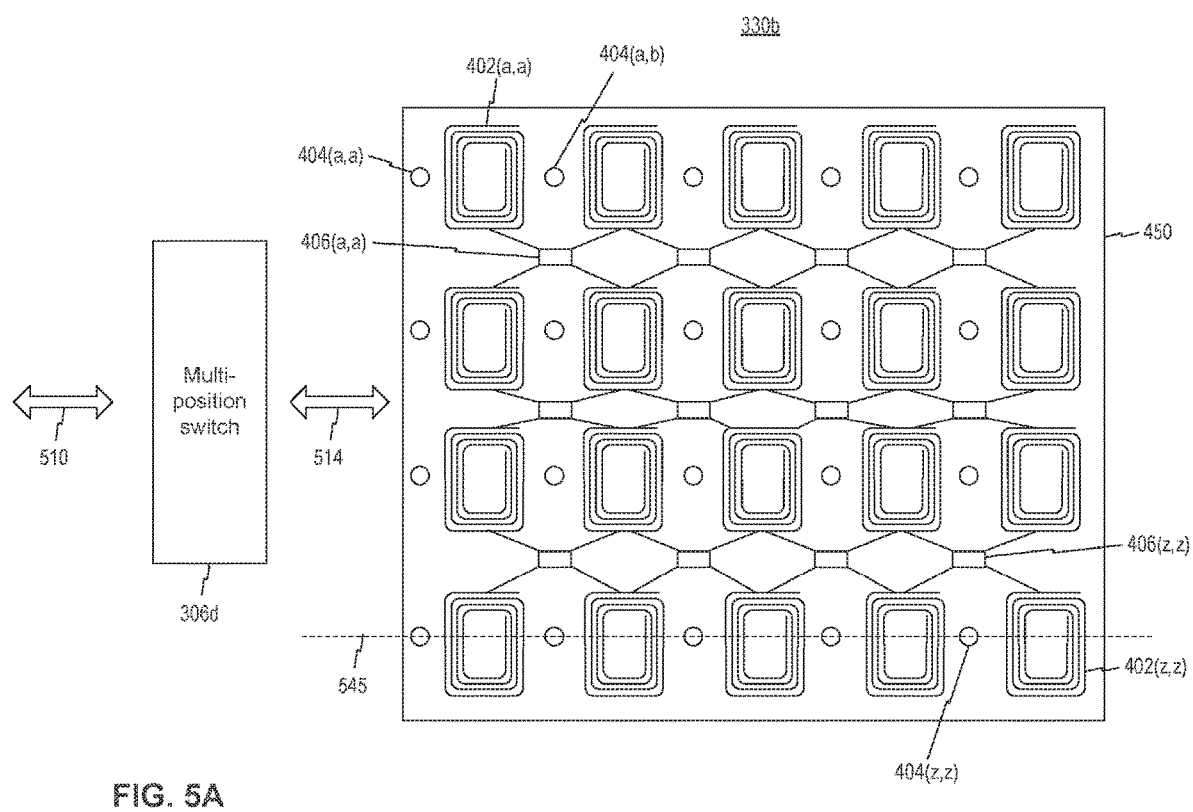
FIG. 5A is a top view of another communication matrix consistent with disclosed embodiments.

FIG. 5A is a top-view of a communication matrix 330b consistent with disclosed embodiments. Communication matrix 330b may be similar to communication matrix 330a, including also coils 402, receivers 404, and local switches 406 on substrate 450. However, as shown in FIG. 5A, the configuration of coils 402, receivers 404, and local switches 406 may be different. In addition, instead of having row and column selection of the coils 402, communication matrix 330b may have a multi-position switch 306d that may connect each one of coils 402 with elements of wireless communication system 300. For example, multi-position switch 306d may connect each one of coils 402 with processor 320.

In communication matrix 330b, substrate 450 may also a single substrate such as a printed circuit board (PCB) with inner traces that connect each one of coils 402 with multi-position switch 306d. However, in other embodiments, substrate 450 may be divided in multiple portions and the communication with multi-position switch 306d may be done through a bus 514 that connect coils.

As shown in FIG. 5A, unlike in communication matrix 330a, in communication matrix 330b receivers 404 are not aligned with coils 402. Instead, in communication matrix 330b, coils 402 are surrounded by receivers 404. Thus, in communication matrix 330b identifying coils 402 with the strongest link for NFC communication may be performed by capturing feedback signals from a plurality of receivers 404 and triangulating at least one of coils 402 that is best suited for NFC. A coil 402 surrounded by receivers 404 with the highest feedback may be identified as the coil with the strongest link for NFC. For example, if receivers 404(a,a) and 404 (a,b) have the highest combined signal, processor 320 may find that coil 402(a,a), has the highest proximity to the NFC device. This positional identification of coils 402 may require some data processing by processor 320, which would compute and compare feedback signals. However, for some applications that are cost sensitive, the configuration of communication 500 may be beneficial to minimize the required number of receivers 404. Therefore, while the triangulation of the selected coils 402 based on multiple feedback signals may increase the communication time, it may reduce the number of receivers required for communication matrix 330b. It may also simplify the fabrication of communication matrix 330b by reducing the number of connections between substrate 450 and multi-position switch 306d.

Like in communication matrix 330a, local switches 406 may be solid state or mechanical switches that connect coils 402. However, local switches 405 in communication matrix 330b may connect four coils simultaneously instead of just two. Therefore, in creating an extended coil, local switches 406 may increase the area of coils 402 up to four times. As it will be discussed in connection to FIG. 11, the ability of extending the coil area may be used attempt improving reception and transmission capability when it is not possible to establish the NFC link with a single coil.

Although not shown in FIG. 5A, in some embodiments each of coils 402 may be directly connected to multi-position switch 306d. In such embodiments to avoid reflectance or power dissipation issues, it may be desirable to have uniform resistance between each one of coils 402 and multi-position switch 306d.

Figure 5B:
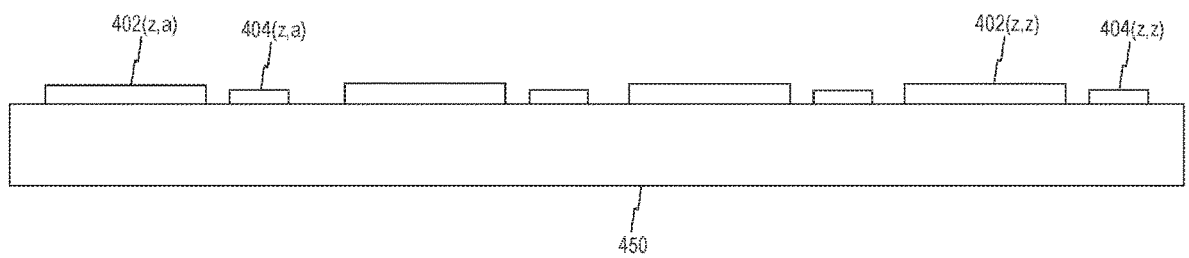
FIG. 5B is a cross-sectional view of the communication matrix of FIG. 5A.

FIG. 5B is a cross-sectional view of a communication matrix 330b consistent with disclosed embodiments. The sideview of FIG. 5B shows communication matrix 330b when viewed on dashed line 545, with receivers 404 and coils 402 on substrate 450. Unlike the cross-sectional views of FIGS. 4B and 4C, FIG. 5B shows that the receivers are not aligned with the coils. Instead, receivers and coils are arranged side by side. This configuration simplifies fabrication of communication matrix 330b and may reduce fabrication costs by minimizing the number of components required for the array. However, it may require additional data processing by processor 320 or other computing unit of wireless communication system 300 in order to collect the signals from receivers 404 to triangulate the position of coil 402 with the strongest link for NFC communication.

In some embodiments, receivers 404 may be equidistance from each of coils 402. In other embodiments, however, the receivers may be placed closer to some coils or have a different arrangement that facilitate triangulation of a selected one from selected coils 402.

Figure 6A:
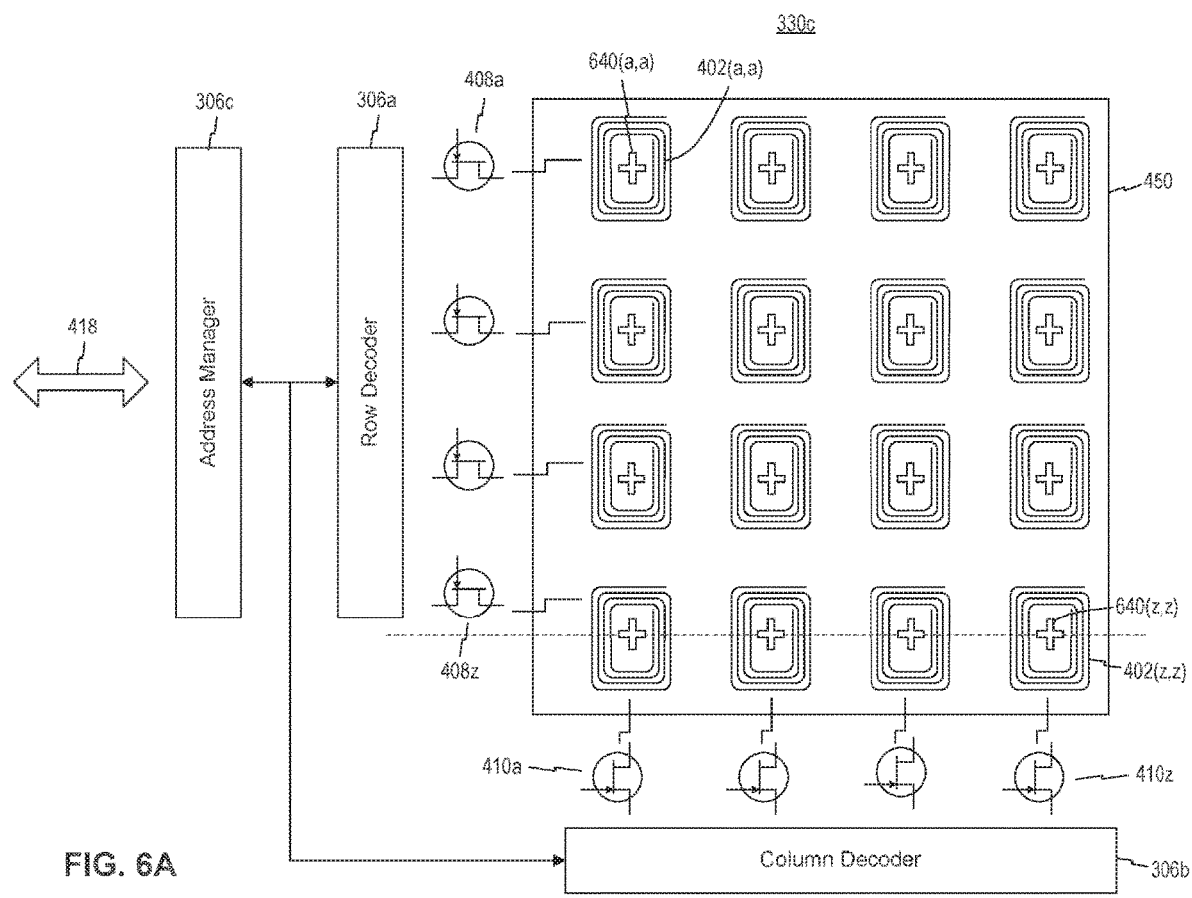
FIG. 6A is a top view of yet another communication matrix consistent with disclosed embodiments.

FIG. 6A is a top view of a communication matrix 330c consistent with disclosed embodiments. Like communication matrix 330a, communication matrix 330c may also include the elements required for row and column addressing of coils 402. Thus, communication matrix 330c may include address manager 306c, row decoder 306a, column decoder 306b, row transistors 408 and column transistors 410. However, communication matrix 330c may include mechanical microdevices 640 aligned with and supporting coils 402, as best shown in FIG. 6B.

Mechanical microdevices 640 may include base plates, actuator paddles, and flexures that support micro-panels in which coils 402 may be attached. For example, mechanical microdevices 640 may include micro-panels on top of the flexures that may be individually rotated ±10-12° to attempt to establish a better NFC link. In such embodiments, mechanical microdevices 640 may turn coils 402 back and forth until an NFC signal with sufficient signal-to-noise ratio is detected.

In some embodiments, mechanical microdevices 640 may replicate some portions of digital micromirror devices (DMD) but, instead of providing a mirror, providing one or more coils that can be redirected in a specific orientation to improve the NFC signal. Thus, like DMDs, mechanical microdevices 640 may include a post which holds the coil 402 and is attached to a yoke. In such embodiments, the yoke rotates with a torsion hinge rotating the coil. The coil may be pulled by the yoke address electrode pull one side of the structure down simultaneously. On the feet of the yoke there may be springs that tips to dampen the impact and facilitate transition to the opposite tilt. This tilt mechanism may be used to redirect coils to a more convenient position without forcing the user to reposition the NFC target. Moreover, mechanical microdevices 640 may be controlled with a CMOS circuit that applies electrostatic forces to the yoke, controlling the tilt angle of the coil.

Figure 6B:
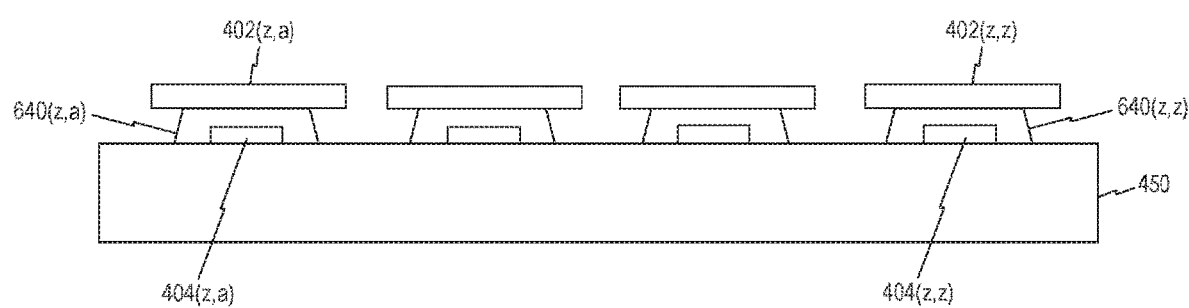
FIG. 6B is a cross-sectional view of the communication matrix of FIG. 6A.

FIG. 6B is a cross-sectional view of communication matrix 330c consistent with disclosed embodiments. The sideview of FIG. 6B shows communication matrix 330c taken along dashed line 645 of FIG. 6A, with mechanical microdevices 640 and coils 602 on substrate 450. FIG. 6B shows coils 402 positioned on mechanical microdevices 640, which, as previously discussed, may tilt the coils to a desired orientation to improve the NFC link. This configuration may increase the cost and complexity of fabrication and operation, but may provide improved functionality for communication matrix 330c. For example, communication matrix 330c is not only able detect the coil that is closest to the target device, but can also correct any tilt misalignments that may undermine the communication.

In addition, FIG. 6B shows receivers 404 below and aligned with coils 402. For embodiments in which receivers 404 detect WiFi, BLE, cellular signals, or other signals that can penetrate coils 402 and mechanical microdevices 640, the configuration shown in FIG. 6B provides complete capability to find selected coils 402 and adjust their tilt. In these embodiments, signals detected from a plurality of receivers 404 may be collected and processed to determine coils 402 that may be used for NFC and the direction of the NFC target. For example, if receiver 404(z,a) detects a feedback signal greater than receiver 404(z,z), processor 320 may determine the NFC target is closed to coil 402(z,a) and in the left side of substrate 450. The processor 320 may configure mechanical microdevice 640(z,a) to tilt coil 402 (z,a) toward the left side of substrate 450. Thus, communication matrix 330c not only selects coils 402 based on their position with respect to the target, communication matrix 330c may also orient the coils 402 to improve NFC links.

FIGS. 7A-7E show exemplary coils and/or antennas for wireless communication consistent with disclosed embodiments. Coils presented in FIGS. 7A-7E may be used to implement one or more of coils 402.

Having a matching shape between coils may be beneficial to improve NFC reliability. For example, communication between two circular coils may be more reliable than the communication between a square coil and a circular coil because most of the electric field is used in the communication when the coils have matching shapes. Thus, when both initiator and target have the same shape of coil, most of the RF field generated by the initiator is used to induce the coil in the target. In contrast, when a square coil tries to communicate with a loop coil, at least some portion of the electric field is not used and may generate noise. Thus, in some embodiments it may be beneficial to use different shapes and sizes of coils in communication matrix 330 because different shapes facilitate strong links. FIGS. 7A-7E disclose coil and/or antennas of different sizes and shapes that may be used in communication matrix 330.

Figure 7A:
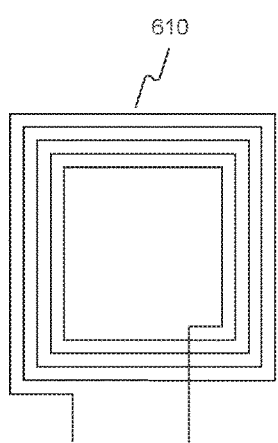
FIG. 7A is a first exemplary coil for wireless communication consistent with disclosed embodiments.

FIG. 7A shows a square loop coil 710. Square loop coil 710 may be used in communication matrix 330 by implementing coils 402 as a plurality of square loop coils 710. Alternatively, at least one but not all of coils 402 may be implemented with the square loop coil 710.

Figure 7B:
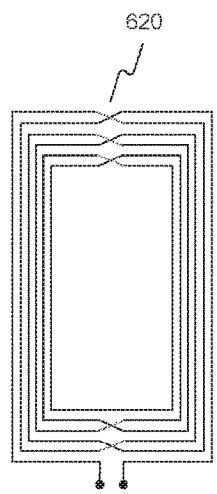
FIG. 7B is a second exemplary coil for wireless communication consistent with disclosed embodiments.

FIG. 7B shows a rectangular loop coil 720. Rectangular loop coil 720 is frequently used for NFC communication and, as shown in FIGS. 4-6, it may be used for coils 402 in communication matrix 330. In some embodiments, rectangular loop coils 720 of different dimensions may be used in communication matrix 330. For instance, some of rectangular loop coils 720 may have a width to height ratio of 2:1, while other rectangular loop coils 720 may have a ratio of 1:3. Alternatively, at least one but not all of coils 402 may be implemented with the rectangular loop coil 720 to provide varied shapes of coils and improve the probability of finding strong links.

Figure 7C:
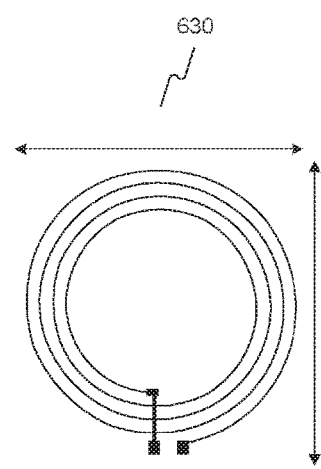
FIG. 7C is a third exemplary coil for wireless communication consistent with disclosed embodiments.

FIG. 7C shows a circular loop coil 730. Circular loop coil 730 may be used for coils 402 in communication matrix 330. Like rectangular loop coils 720, circular loop coils 730 may have different width and height ratio. In some embodiments, at least one but not all of coils 402 may be implemented with the circular loop coil 730 to provide varied shapes of coils and improve the probability of finding strong links.

Figure 7D:
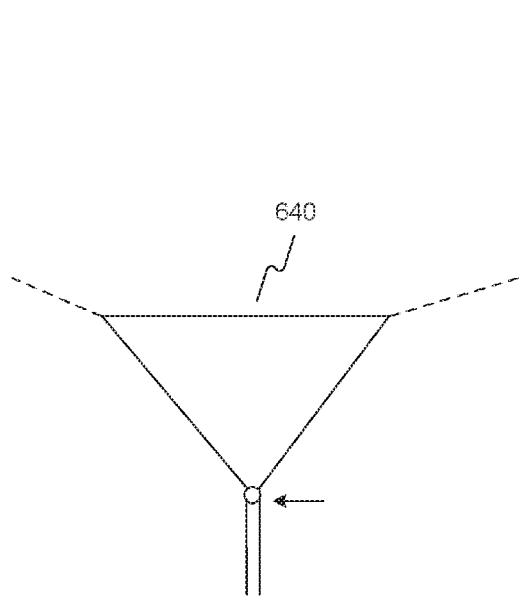
FIG. 7D is a first exemplary antenna for wireless communication consistent with disclosed embodiments.
Figure 7E:
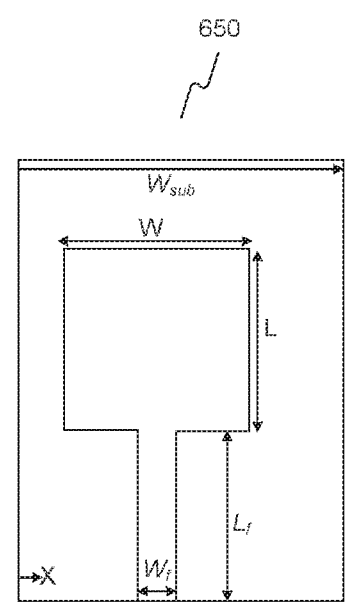
FIG. 7E is a second exemplary antenna for wireless communication consistent with disclosed embodiments.

FIG. 7D shows a triangular microstrip antenna 740 and FIG. 7E shows a square microstrip antenna 750. These microstrip antennas can also function as one or more of coils 402. While microstrip antennas are not frequently used for NFC communication, they have geometric characteristics that may be beneficial for certain applications of communication matrix 330. For example, microstrip antennas such as 740 and 750 are light weight, have a low volume, and have a planar configuration. Therefore, microstrip antennas may be used in communication matrix to provide additional varied coverage that may help identify the position of an NFC target. In addition, because microstrip antennas 740 and 750 are inexpensive to fabricate and can be used in divided portions on a substrate 450, these antennas may be used to lower manufacturing cost, support both linear as well as circular polarization, provide capability of multiband operation, and enhance communication matrix 330 mechanical robustness.

Figure 8:
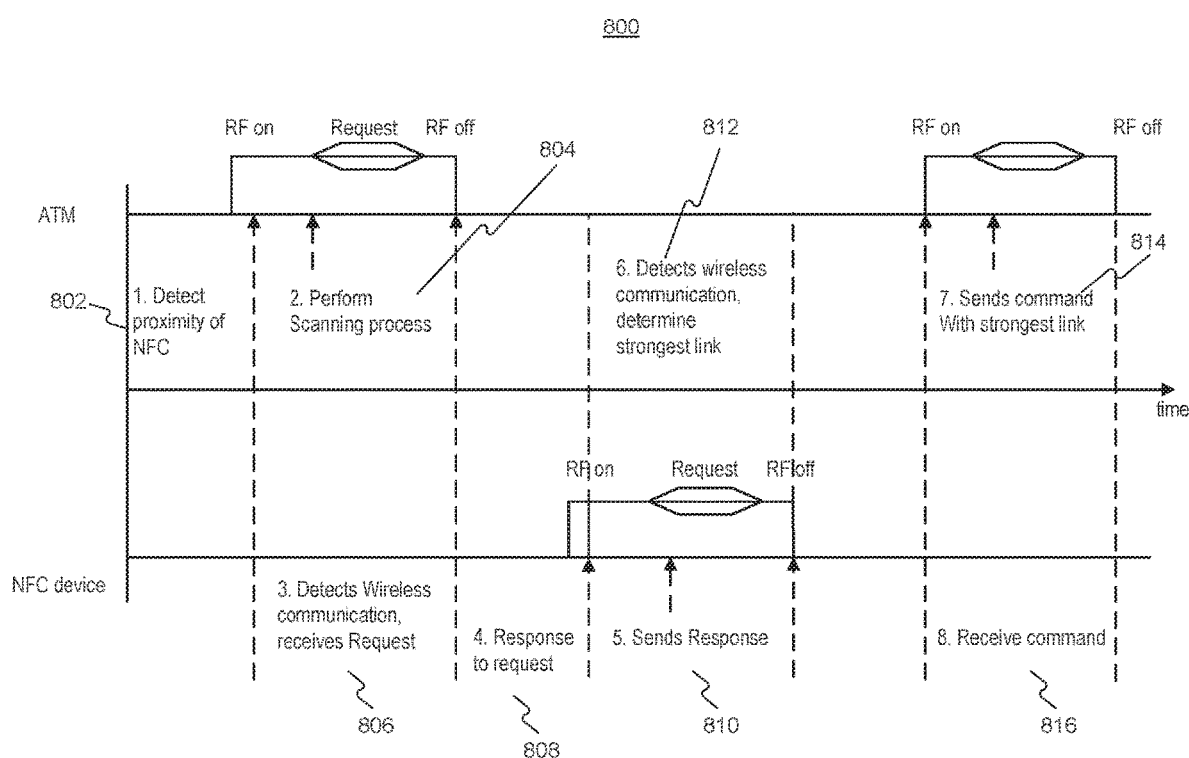
FIG. 8 is an exemplary communication initiation timeline consistent with disclosed embodiments.

FIG. 8 is an exemplary communication initiation timeline 800 consistent with disclosed embodiments. Communication initiation timeline 800 may be implemented between an initiator system, such as wireless communication system 300, and a target device that is seeking to complete a transaction or identify a user. For example, communication initiation timeline 800 may be implemented between ATM 100 or payment terminal 200, and a smartphone or credit card. In some embodiments, as described below, steps of the initiator system in initiation timeline 800 may be implemented by processor 320. Nonetheless, other elements of wireless communication system 300 may implement the initiator system steps. For example MCU 317 or wireless module 318 may implement the initiator system steps of communication initiation timeline 800. In addition, steps of the target device in initiation timeline 800 may be implemented by an external NFC device.

At time 802, processor 320 may detect the proximity of an NFC device. In some embodiments, the detection may be done by identifying response signals from an NFC enabled device. For example, processor 320 may identify that a target device with NFC capabilities is within 10 cm when it receives a response signal from coils of the communication matrix 330. In such embodiments, the NFC communication may be in a perpetual active mode listening for NFC responses. While this detection method may increase overall power consumption, it may simplify the system by minimizing the number of required components. In other embodiments, the detection of NFC device in step 720 may be done via other signals unrelated to NFC communication. For example, the detection of an NFC target may be associated with the reception of signals in receivers 404. For example, receivers 404 may detect broadcasted WiFi or BLE signals. Additionally, or alternatively, the detection of proximity of the device may be based on proximity sensor 325 in wireless communication system 300. For example, proximity sensor 325 may be located close to a user interface of ATM 100 or payment terminal 200, and detect movement of a system that may communicate via NFC. Alternatively, or additionally, an operator of wireless communication system 300 may interact with wireless communication system 300 to indicate a the proximity of an NFC enabled device. For example, when wireless communication system 300 is part of a payment terminal, a cashier may send a signal to processor 320 indicating the proximity of an NFC device.

As shown in time 804 of FIG. 8, processor 320 may activate RF modules and send a scanning request. For example, processor 320 may activate wireless module 318 and selector 306 in time 804. In some embodiments, the scanning request may sequentially transmit probing signals to each one of coils 402. These probing signals may be used by processor 320 to determine a selected coil from coils 402 with the best coupling. Additionally, or alternatively, probing signals may include an RF request that, when transmitted by coils 402, determines whether a target device is in the vicinity of communication matrix 330.

In time 806, the target device may receive a RF requests from coils 402. The target device normally does not have the ability to identify which one of the coils 402 sent the request, but it may nevertheless prepare to broadcast a response to the requests in time 808. In embodiments in which the target device is an active device, such as smartphone or smartwatch, after time 808 the target device may activate an RF module in the target device to respond to the request received in time 806. In embodiments in which the target device is passive and includes only an NFC tag, no RF module is activated, and instead the target device only passively responds to the request in time 810.

In time 812, processor 320 may detect the signal emitted from the target device and select a coil or coils with the strongest coupling. Processor 320 may process the information received and in time 814 prepare a communication command. For example, processor 320 may engage wireless module 318 to analyze the signal received from the target device and generate a response that initiate communication. Thus, in time 814 processor 320 may send the communication request using the selected one or more of coils 402 that is associated with the strongest coupling.

In time 816, the target device may receive the communication command. In some embodiments the communication may terminate after the target device receives the command. For example, for wireless identification applications, in which it is only necessary to establish the identity of the wireless device, communication initiation timeline 800 may end with the reception of command in time 816. However, in embodiments where the target device will exchange information with the system, a series of additional communications and responses may continue after time 816. For example, when the communication is between a smartphone and payment terminal 200, the communication may include authentication steps to secure the transaction.

Figure 9:
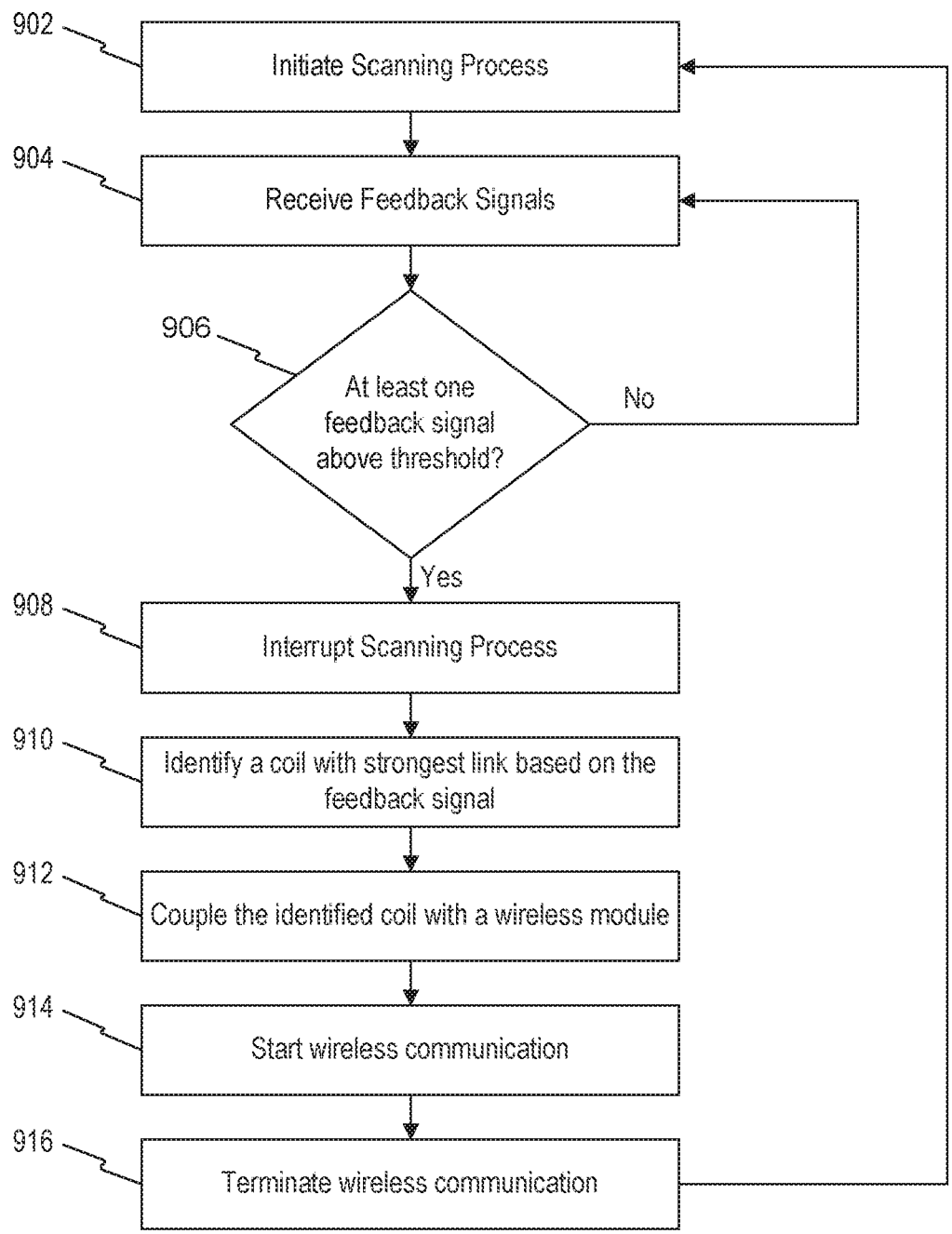
FIG. 9 is an exemplary flow chart illustrating a wireless communication process consistent with disclosed embodiments.

FIG. 9 is an exemplary flow chart illustrating a wireless communication process 900 consistent with disclosed embodiments. In some embodiments, as described below, process 900 may be implemented by processor 320. However, in other embodiments, other elements of wireless communication system 300 may implement process 900 or parts of process 900. For example, cryptographic coprocessor 316, MCU 317, or wireless module 318, may implement a portion or the entirety of process 900. Additionally, a processing unit external but coupled to wireless communication system 300 may perform a portion or the entirety of process 900. For example a central processing unit of ATM 100 or payment terminal 200 may perform some of process 900.

Process 900 may begin with step 902 in which processor 320 may initiate a coil scanning process. In some embodiments, processor 320 may initiate scanning process as part of a wireless communication system 300 boot up and interrogate each one of coils 402. That is, anytime wireless communication system 300 is turned on, processor 320 initiates the coil scanning process by default. In other embodiments, the scanning process may be initiated by some elements of wireless communication system 300. For example, is some embodiments the scanning process of step 902 may be initiated by a signal from proximity sensor 325. In such embodiments, step 902 may be executed when proximity sensor 325 detects a presence of a target device. In other embodiments, step 902 may be performed whenever power management module 310 begins operation. For example, anytime the power management module 310 starts receiving power, processor 320 may initiate the scanning process of step 902.

The scanning process may include a sequential connection between coils 402 and processor 320 to measure feedback signals during a time period. For example, for the scanning process processor 320 may configure selector 306 to sequentially connect processor 320 with each one of the coils for a time required by processor 320 to process and/or store the feedback signal. In other embodiments, the scanning process may be random. For example, processor 320 may configure selector 306 to connect with a randomly selected coil to gather feedback signals and repeat the process periodically. In other embodiments, the sequence of connection between the processor 320 and the coils may be defined by the location of the coils. For example, when the scanning process of step 902 is applied to communication matrix 330, the queried coil may alternate between the top portion and the bottom portions of communication matrix 330 or may be from one quadrant from communication matrix 330. In this way, the scanning process may systematically attempt to find a coil that is proximity with the NFC target. In yet other embodiments, processor 320 may implement search algorithms to identify coils 402 with the stronger coupling. For example, processor 320 may implement an A start (A*) search algorithm to identify a coil 402 with the strongest link. Additionally, or alternatively, processor 320 may scan coils 402 with permutating algorithms, such as Heap's algorithm, to identify the strongest link.

In step 904, processor 320 may receive the feedback signals from the scanning process. The feedback signals may include a current value associated with coils. For example, the feedback signals may be a response current measured in micro or milliamps. In other embodiments, however, the feedback signals may be in other forms, such as a voltage, capacitance, or inductance value with an associated signal-to-noise (SNR). In yet other embodiments, the feedback signal may be a digital signal.

In some embodiments, processor 320 may store the feedback signals in memory unit 319 and then wait to gather at least one feedback signal for each one of coils 402 before comparing all of them. In this way, processor 320 would identify and select the strongest possible link available in communication matrix 330. In other embodiments, processor 320 may process signals as they are received and simply identify a signal that is above a threshold, without any required comparison between signals. This approach may expedite the communication because it process the signals in real-time and does not require collection the larger sample of feedback signals before continuing to time 806. However, this approach may not find the strongest link for communication.

In step 906, processor 320 either identifies the strongest signal or determines whether at least one of the signals is above the trigger threshold. For example, in embodiments in which the feedback signal is a current, processor 320 may identify the highest current or determine whether the feedback current is above a minimum feedback current required to establish communication. In such embodiments, processor 320 may be programmed to only establish communication if the feedback signal is above a current level because such current level is necessary to modulate the NFC communication. For example, processor 320 may only initiate communication with a selected coil if the feedback signal is above a threshold that could allow Manchester coding and/or modified miller coding for NFC communication.

In other embodiments, however, the trigger threshold may be a different value selected by the user. For example, a user that has a strong interest in secure communication may require feedback signals with higher thresholds than a user interested in faster communication. Requiring larger feedback thresholds could result in closer coupling between the NFC device and the initiator. Such communication could be more difficult to establish but could reduce chances of spoofing attacks and improve the communication's security. On the other hand, feedback signals with lower thresholds could permit greater distance between the target and the initiator, allowing faster connections but could be more susceptible to spoofing attacks.

In yet other embodiments, the trigger threshold may be a signal to noise ratio of the feedback signal. In time 806, processor 320 may sample the feedback signal and estimate an SNR. If the estimated SNR is above a threshold that is required for reliable NFC communication, processor 320 may determine that the feedback signal is above the threshold for communication.

For embodiments using receivers 404 to gather feedback signals, in step 906 processor 320 may correlate the intensity of the signal received by the receiver with a position of the NFC target. For example, receivers 404 may be configured to detect WiFi signals from the NFC target. Processor 320 may determine the distance between the NFC target and corresponding coils 402 based on the intensity of the WiFi signal. Similarly, receivers 404 may detect BLE signals and determine the distance between the NFC target and corresponding coils 402 using based on the BLE intensity. In some embodiments, the relationship between signal intensity and distance to NFC device may be calibrated for each wireless communication system 300. For example, when wireless communication system 300 is setup on ATM 100 or payment terminal 200, a user may calibrate the relationship between distance of an NFC target and the intensity of WiFi, Bluetooth, and; or cellular signals.

When processor 320 determines that none of the feedback signals are above the trigger threshold (step 906: No), processor 320 may return to step 904 and continue receiving feedback signals from the scanning process. Alternatively, or additionally, processor 320 may change the channel used to gather feedback signals. For example, processor 320 may reconfigure receivers 404 to go from capturing WiFi to capturing cellular signals and return to step 904. However, if processor 320 determines at least one feedback signal is above the trigger threshold (step 906: Yes), processor 320 may interrupt the scanning process and continue to step 908. In some embodiments, interrupting the scanning process leaves selector 306 coupled to the coil with the feedback signal that is above the threshold. Specifically, when processor 320 process signals in real time, processor 320 may stay coupled to a coil 402 with a feedback signal above the threshold by interrupting the scanning process.

In step 910, processor 320 may select a coil from the plurality of coils 402 based on the feedback signal above the trigger threshold. For example, processor 320 may identify a selected coil after comparing all feedback signals gather from receivers 404. Alternatively, or additionally, the selection of the selected coil may also be based on secondary considerations. For example, processor 320 may determine not only the magnitude of the feedback signal but also an associated SNR to determine the selected coil. In such embodiments, a coil associated with the highest feedback signal may not be selected if it is also associated with a noisy signal. In this way, processor 320 may target to couple with the coil that is likely to provide the best communication in step 910. In yet other embodiments, in which the receivers 404 are not aligned with coils 402, see for example communication matrix 330b in FIG. 5A, in step 910 processor 320 may compute the selected coil based on a plurality of feedback signals. For example, processor 320 may identify a selected coil 402 that is between two receivers 404 with the highest combined feedback signal. In certain applications, a group of several coils 220 may be selected to provide the most reliable communication.

In step 912, processor 320 may configure selector 306 to couple with the selected one of coils 402. In other embodiments, processor 320 may configure selector 306 to couple the selected coil with wireless module 318. In yet other embodiments, processor 320 may couple the selected coil with wireless module 318 with a different switching device. For example, in some embodiments multi-position switch 306d may added to communication matrix 330a and be configured independently from row and column circuitry. By having dedicated devices for the RF signals it may be easier to prevent impedance coupling issues that impede proper communication. In such embodiments, processor 320 may configure independently the switching devices to directly couple wireless module 318 with the selected coil 402.

In step 914, processor 320 may generate a command to start wireless communication. For example, processor 320 may provide instructions to wireless module 318 to communicate transmit and receive NFC signals to and from selected coils 402. In some embodiments, to start wireless communication processor 320 may transmit a START communication command to the selected coil 402. The START communication command may include, among other things, identification packets, authentication packets, request for identification information, request for authentication, and/or other hand-shake packets to begin communications.

In step 916, processor 320 may receive or generate a command to terminate the communication. For example, processor 320 may receive from an NFC device a termination command that indicates the NFC communication was successfully completed and that the link should be terminated. Alternatively, or additionally, processor 320 may generate a termination command with it determines the communication has terminated when it does not receive a response from the NFC device and generate a termination command. In some embodiments, processor 320 may return to step 902 after step 916 and reinitiate the scanning process to prepare of a following communication. However, in other embodiments, processor 320 may enter a power saving mode after step 916. For example, processor 320 may transmit instructions to power management 310 to enter the power saving mode after step 916 and only restart process 900 when proximity sensor 325 the presence of a target device.

Figure 10:
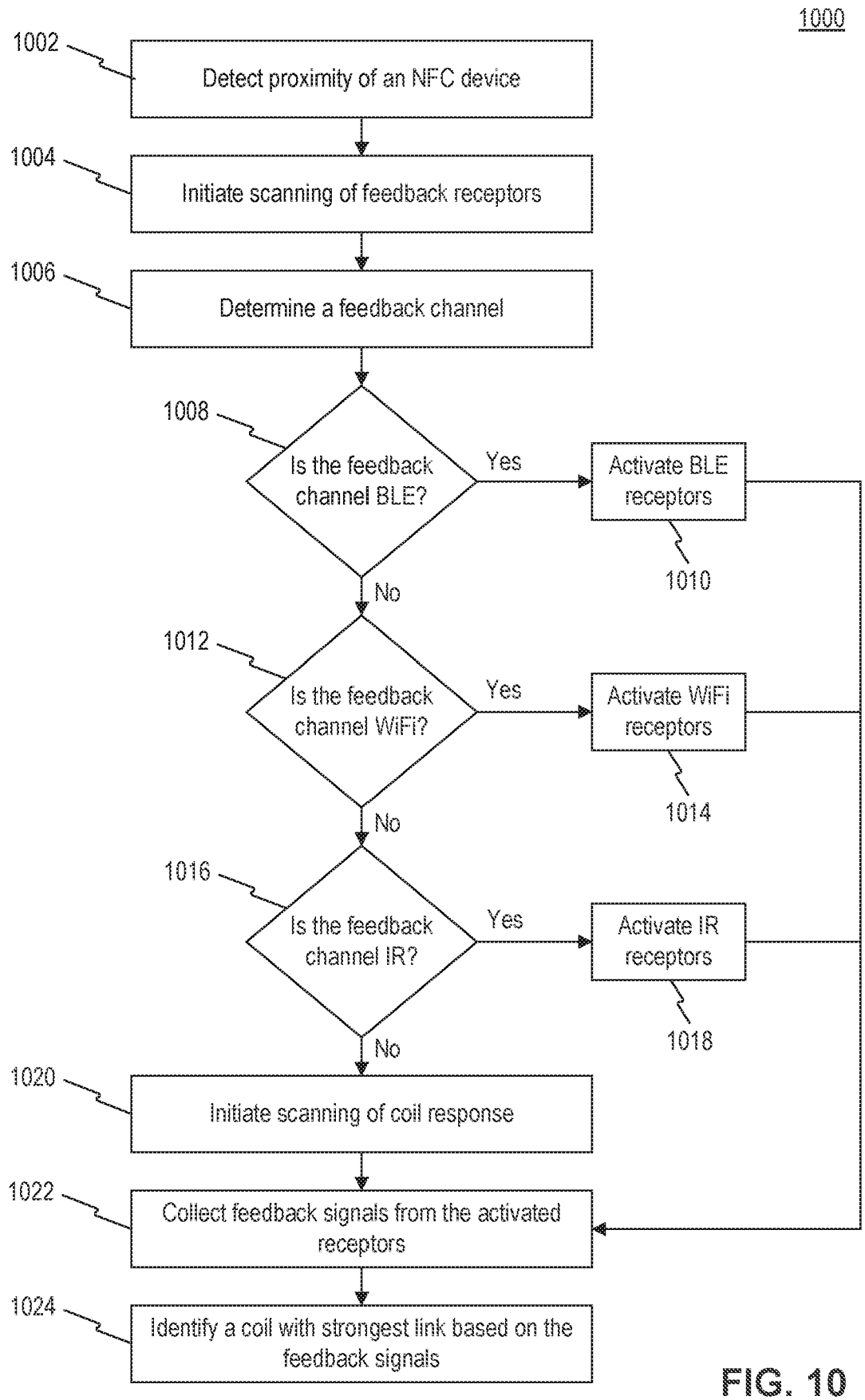
FIG. 10 is an exemplary flow chart illustrating a coil coupling process consistent with disclosed embodiments.

FIG. 10 is an exemplary flow chart illustrating a coil coupling process 1000 consistent with disclosed embodiments. In some embodiments, as described below, process 1000 may be implemented by processor 320. However, in other embodiments, other elements of wireless communication system 300 may implement process 1000 or parts of process 1000. For example, cryptographic coprocessor 316, MCU 317, or wireless module 318, may implement a portion or the entirety of process 1000. Additionally, a processing unit external but coupled to wireless communication system 300 may perform a portion or the entirety of process 900. For example a central processing unit of ATM 100 or payment terminal 200 may perform some of process 1000.

Process 1000 may being with step 1002, in which processor 320 may detect an NFC device is in proximity to communication matrix 330. For example, processor 320 may detect wireless signals from an NFC target that indicate proximity and/or processor 320 may receive a signal from proximity sensor 325.

In step 1004, processor 320 may interrogate receivers 404 to detect feedback channels; that is, to detect what communications media (WiFi, Bluetooth, Zigbee, etc) are available. For example, processor 320 may configure selector 306 to sequentially couple each of receivers 404 with processor 320 and measure feedback signals.

In step 1006, processor 320 may determine the feedback channel that will be used to select one or more of coils 402. As previously discussed, communication matrix 330 may include a plurality of receivers to identify feedback signals in non-NFC frequencies. While some embodiments may use multiple non-NFC frequencies to select a coil, other embodiments may focus on a single feedback channel to facilitate data processing and minimize power consumption. Thus, in step 1006 processor 320 may start the routines to determine selected feedback channel. The selection of the feedback channel may be based on test receivers 404. For example, centrally located receivers in communication matrix 330 may be always turned on to create a sample or test feedback signal that may be used to determine which of feedback signals can be used for coil determination. Thus, after step 1006 processor 320 may initiate a process to determine which channel will be used to determine proximity.

In step 1008 processor 320 may determine whether the feedback channel will be BLE. For example, based on a test receiver 404 that detects a strong BLE signal, processor 320 may decide to use BLE as the feedback channel (step 1008: Yes) and continue to step 1010 and activate BLE receivers 404. However, processor 320 may also determine that the BLE channel is not strong enough to find a selected coil for NFC (step 1008: No) and continue to step 1012.

In step 1012, processor 320 may determine whether the feedback channel will be WiFi. For example, based on a test WiFi receiver 404 that senses broadcasted WiFi signals processor 320 may determine that it will identify the selected coil from coils 402 using WiFi as the feedback channel (step 1012: Yes). Then, processor 320 may continue to step 1014 and activate WiFi receivers 404. However, processor 320 may find that the WiFi signal is not strong enough to find a selected coil for NFC (step 1012: No) and continue to step 1016.

In step 1016, processor 320 may determine whether the feedback channel will use Infra-Red signals. For example, based on a test IR receiver 404 that senses broadcasted IR signals, processor 320 may decide to use IR feedback signals to determine the best coil for NFC communication (step 1016: Yes). Then, processor 320 may continue to step 1018 and activate IR receivers 404. If processor 320 finds that there IR signals cannot be used as feedback signals (step 1016: No), processor 320 may attempt to find different feedback signals. In some embodiments processor 320 may replicate the sequence of steps 1008-1018 for other potential feedback signals. For example, instead of, or in addition to, BLE, WiFi, and IR signals, processor 320 may use the intensity of broadcast cellular signals to identify the best coil 402 for NFC. Additionally, or alternatively, processor 320 may attempt to use feedback signals in Zigbee frequencies as feedback signals.

In other embodiments, when IR signals are not used as feedback signals (step 1016: No), processor 320 may continue to step 1020 and attempt to find the best coil by performing an NFC scanning process like the one described for step 902. That is, if feedback with non-NFC frequencies is unsuccessful, then processor 320 may attempt to determine a selected coil using the NFC coils themselves.

Regardless of the selected type of feedback signal, to continue the communication process 1000 in step 1022 processor 320 may collect and/or process the feedback signals. For example, processor 320 may store feedback signals in memory unit 319. Alternatively, processor 320 may compare each one of the feedback signals with a triggering threshold using, for example, an analog comparator.

Based on the feedback signals, in step 1024 processor 320 may identify at least one coil with the strongest coupling for NFC and initiate communication using the identified coil with strongest coupling.

Figure 11:
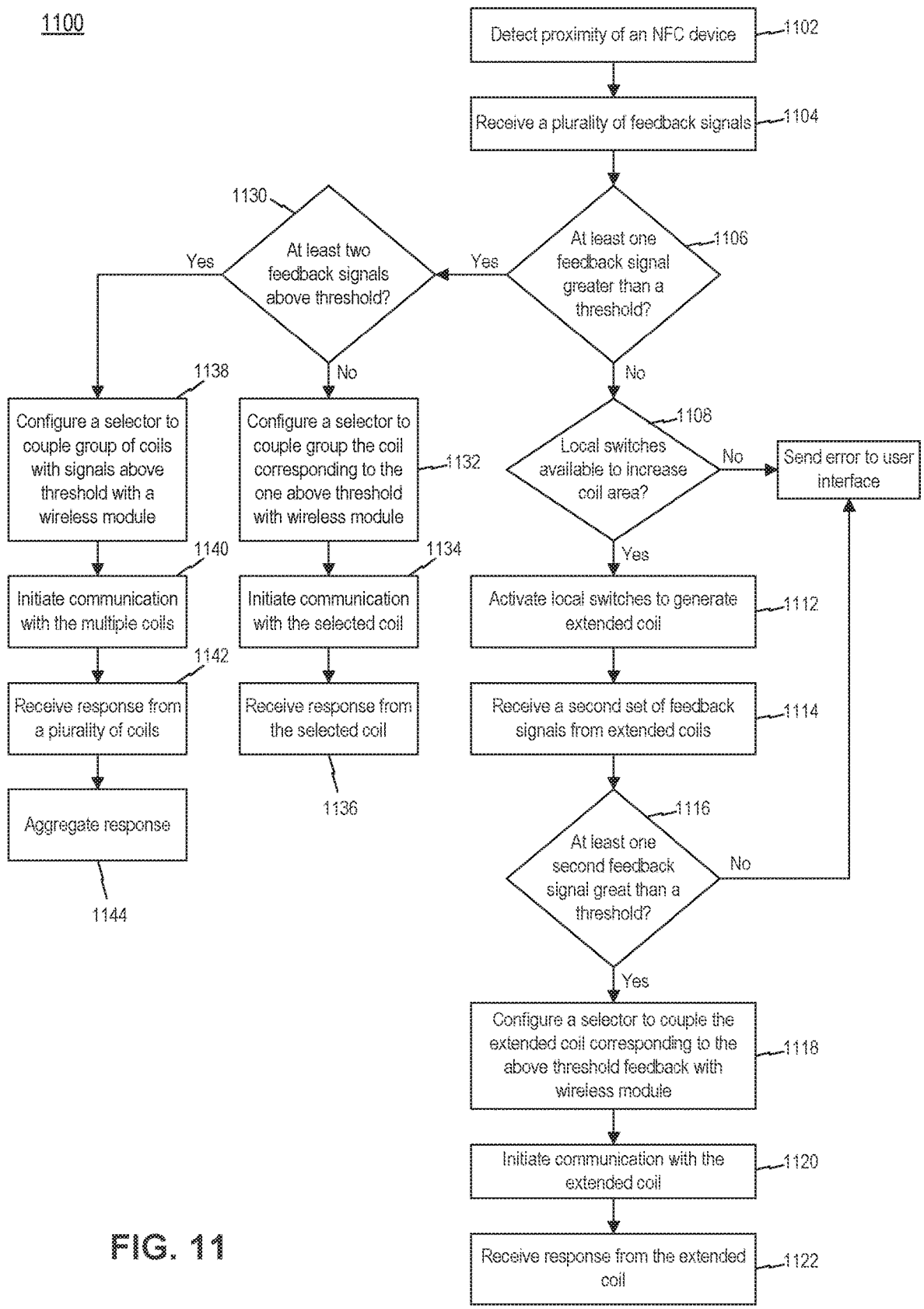
FIG. 11 is an exemplary flow chart illustrating a wireless communication process consistent with disclosed embodiments.

FIG. 11 is an exemplary flow chart illustrating a communication process 1100 consistent with disclosed embodiments. In some embodiments, as described below, process 1100 may be implemented by processor 320. However, in other embodiments, other elements of wireless communication system 300 may implement process 1100 or parts of process 1100. For example, cryptographic coprocessor 316, MCU 317, or wireless module 318, may implement a portion or the entirety of process 1100. Additionally, a processing unit external but coupled to wireless communication system 300 may perform a portion or the entirety of process 900. For example a central processing unit of ATM 100 or payment terminal 200 may perform some of process 1100.

Process 1100 may be used as a more robust alternative to process 900. It may be implemented by communication matrix 330 when it contains local switches 406 that can extend the effective area of the coils.

Process 1100 may begin with step 1102, in which processor 320 may detect an NFC device is in proximity to communication matrix 330. For example, processor 320 may detect wireless signals from an NFC target that indicate proximity and/or processor 320 may receive a signal from proximity sensor 325.

In step 1104, processor 320 may receive the feedback signals from the NFC target. The feedback signals may include a current value associated with coils. For example, the feedback signals may be a response current measured in micro or milliamps. In other embodiments, however, the feedback signals may include other analog signals with an associated signal-to-noise (SNR). In yet other embodiments, the feedback signal may be received from one or more of receivers 404. For example, the feedback signal may be a detected intensity of BLE, IR, or WiFi signals. Additionally, or alternatively, processor 320 may detect the intensity of cellular signals as the feedback signals in step 1104.

In some embodiments, in step 1104 processor 320 may store the signals in memory unit 319 and then wait to gather at least one feedback signal for each one of coils 402 before comparing all of them. In this way, processor 320 would identify and select the strongest possible link available in communication matrix 330. In other embodiments, processor 320 may process signals in real-time to identify a signal that is above a threshold, without any required comparison between signals. This approach may expedite the communication because it process the signals in real-time and does not require collection the larger sample of feedback signals before continuing to step 1106, but it may not find the strongest link for communication.

In step 1106, processor 320 may determine whether at least one of the feedback signals is greater than a threshold. For example, processor 320 may determine whether a WiFi intensity signal is above a threshold that is correlated with an NFC target being in close proximity to at least one coil 402. Alternatively, or additionally, processor 320 may determine whether the intensity of BLE, IR, or cellular signals are above a threshold that indicates and NFC target is within 10 cm of communication matrix 330. In other embodiments, processor 320 may determine whether an induced current in an NFC coil is a feedback signal above the threshold required for good NFC modulation.

If processor 320 determines that at least one feedback signal is above a threshold (step 1130: Yes) processor 320 may determine it is possible to establish NFC links with the NFC target and proceed to step 1130.

To enhance communication quality, in step 1130 processor 320 may determine the number of feedback signals that were above the threshold. If more than one coil is related with a feedback signal above the threshold (step 1130: Yes), processor 320 may proceed to communicate using multiple coils at the same time. By increasing the number of coils simultaneously used in communication, the coils reception and transmission of RF field may be improved. Thus, processor 320 may continue to step 1138 and configure selector 306 to couple the group of coils 402 that have feedback signals above the threshold with processor 320 and/or wireless module 318. With this arrangement, processor 320 will be coupled to multiple coils that are close to the NFC target and broadcast and receive signals simultaneously improving RE transmission and reception.

In step 1140, processor 320 may initiate the communication process using the group of multiple coils that is associated with feedback signals above the threshold by, for example, transmitting a START command and receive a response from the NFC device in step 1142. Because the communications received in step 1142 may be composed of multiple signals from different coils, in step 1144 processor 320 may aggregate the responses from multiple coils to form a composite response. For example, processor 320 may add signals from selected coils using an analog adder. Alternatively, or additionally, processor 320 may digitize signals from selected coils in step 1144. In other embodiments, processor 320 may aggregate response signals by selecting a signal with the best SNR. For example, processor 320 may estimate an SNR for each one of the signals received form the group of selected coils 402. Then, using selector 306 or other switching device, processor 320 may eliminate response signals with lower SNRs and only process the signal with highest SNR.

However, if in step 1130 processor 320 determines that only one of the feedback signals is above the threshold (step 1130: No), processor 320 may continue to step 1132 and configured selector 306 to couple the coil corresponding with the feedback signal above the threshold with processor 320 and/or wireless module 318. This single-coil communication would not benefit from the expanded area that is achieved by coupling simultaneously multiple coils. However, it facilitates data processing because it does not require aggregating multiple signals. Thus, in step 1134 processor 320 may initiate an NFC link using the identified coil with feedback signal above the threshold by, for example, transmitting a START command and receive the response from the selected coil in step 1136.

In some cases, processor 320 may find that none of the feedback signals received during step 1104 is above the signal threshold (step 1106: No). In such embodiments, processor 320 may nevertheless attempt to establish NFC communication by expanding coils to create a larger antenna that has enhanced RE transmission and reception.

In step 1108, processor 320 may determine whether there are local switches 406 in communication matrix 330 that could be used to connect coils to create an expanded coil with enhanced area. If processor 320 determines there are no local switches 406 available to increase coil area (step 1108: No), processor 320 may continue to step 1110 and transmit an error signal to a user interface. For example, processor 320 may send a signal to display 116 of ATM 100 that informs a user that wireless communication is not possible. However, if processor 320 determines there are local switches 406 available to increase coil area (step 1108: Yes), processor 320 may continue to step 1112.

In step 1112, processor 320 may activate one or more of the local switches to generate an extended coil. For example, processor 320 may activate switches 406 to connect adjacent coils 402. Alternatively, processor 320 may activate switches 406 to connect multiple coils 402 and create a larger coil with a larger effective area.

In step 1114, processor 320 may receive feedback signals for the extended coils. For example, processor 320 may receive a feedback current from the extended coils. Alternatively, or additionally, processor 320 may aggregate the feedback response of a plurality of receivers 404 that are associated with the group of coils that has been connected by the local switches 406.

In step 1116, processor 320 may determine whether at least one of the feedback signals is above a threshold for the extended coil. For example, processor 320 may determine whether the combined feedback current of the coils are above a threshold current. Alternatively, or additionally, processor 320 may determine whether the response from receivers 404 is above a threshold that would enable NFC communication. If processor 320 determines that none of the feedback signals from the extended coils is above the threshold (step 1116: No), processor 320 may continue to step 1110 and send an error signal to a user interface. For example, processor 320 may send an error signal to a user interface of ATM 100 or a user interface of payment terminal 200.

However, if in step 1116 processor 320 determines that at east one of the feedback signals from extended coils is above the threshold, processor 320 may continue to step 1118 and configure wireless communication system 300 for NFC using the extended coil. For example, wireless communication system 300 may configure selector 306 to couple the extended coil corresponding to the above threshold feedback with processor 320 and/or wireless module 318.

In step 1120, processor 320 may initiate wireless communication using the extended coil and receive a response communication in step 1122. For example, in step 1120 processor 320 may generate RF signals to request identification of the NFC target and in step 1122 processor 320 may receive the response from the NFC device. In some embodiments, to start wireless communication processor 320 may transmit a START communication command to the extended coil in step 1120. The START communication command may include, identification packets, authentication packets, request for identification information, request for authentication, and/or other hand-shake packets to begin communications.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

What is claimed is:

1. A communication matrix comprising:
   a plurality of coils;
   a plurality of local switches coupled to at least four of the plurality of coils;
   a multi-position switch directly connected to each one of the plurality of coils, wherein resistances between the plurality of coils and the multi-position switch are uniform, and wherein the multi-position switch comprises:
   a row decoder coupled to one or more of the plurality of coils through a transition impedance;
   a column decoder coupled to one or more of the plurality of coils through the transition impedance; and
   an address manager coupled to the column decoder and the row decoder;
   a plurality of receivers surrounding each one of the plurality of coils; and
   a processor coupled to the multi-position switch and configured to perform operations comprising:
   receiving feedback signals from the plurality of receivers indicating proximity of a communication device;
   identifying at least two selected coils from the plurality of coils by triangulating highest feedback signals; and
   initiating a communication with the communication device using the at least two selected coils, wherein initiating the communication with the communication device comprises configuring the address manager to couple the at least two selected coils through the row decoder and the column decoder.

2. The communication matrix of claim 1, wherein the plurality of coils and the plurality of receivers are disposed on a single substrate.

3. The communication matrix of claim 2, wherein the plurality of local switches are disposed on the single substrate.

4. The communication matrix of claim 3, wherein:
   the single substrate comprises a printed circuit board;
   the printed circuit board is positioned behind an NFC area of an automatic teller machine; and
   the NFC area is covered by an NFC graphical icon.

5. The communication matrix of claim 1, wherein the plurality of coils and the plurality of receivers are disposed on multiple pieces of a substrate arranged in an exterior surface of an automatic teller machine surface.

6. The communication matrix of claim 5, wherein the multiple pieces comprise a first piece nearby to an NFC area, a second piece nearby a keyboard, and a third piece nearby a display.

7. The communication matrix of claim 1, wherein the plurality of coils comprise coils with a plurality of shapes and sizes.

8. The communication matrix of claim 7, wherein the plurality of coils are arranged in a square matrix.

9. The communication matrix of claim 1, wherein the plurality of coils are arranged in a square matrix.

10. The communication matrix of claim 1, wherein the plurality of receivers comprise at least one of micro-sized WiFi adapters, micro BLE receivers, micro IR receivers, and RF signal meters tuned for cellular frequencies.

11. The communication matrix of claim 1, wherein the row decoder comprises one or more multiplexers directly connected to the address manager.

12. The communication matrix of claim 1, wherein the row decoder comprises one or more multiplexers directly connected to the address manager.

13. The communication matrix of claim 1, wherein each of the plurality of receivers are connected to at least four of the plurality of coils.

14. The communication matrix of claim 13, wherein each of the plurality of receivers are equidistant from the at least four of the plurality of coils connected to a respective receiver of the plurality of receivers.

15. The communication matrix of claim 13, wherein:
    identifying the at least two selected coils comprises identifying four selected coils; and
    initiating the communication comprises connecting the four selected coils to the multi-position switch simultaneously.

16. The communication matrix of claim 1, wherein identifying the at least two selected coils comprises:
    determining whether at least two of the feedback signals are above a threshold;
    configuring the multi-position switch to couple a wireless module with the at least two selected coils; and
    aggregating responses from the at least two selected coils using an analog adder.

17. A machine comprising:
    a plurality of coils;
    a plurality of local switches coupled to at least four of the plurality of coils;
    a multi-position switch directly connected to each one of the plurality of coils, wherein resistances between the plurality of coils and the multi-position switch are uniform and wherein the multi-position switch comprises:
    a row decoder coupled to one or more of the plurality of coils through a transition impedance;
    a column decoder coupled to one or more of the plurality of coils through the transition impedance; and
    an address manager coupled to the column decoder and the row decoder;
    a plurality of receivers surrounding each one of the plurality of coils; and
    a processor coupled to the multi-position switch and configured to perform operations comprising:
    receiving feedback signals from the plurality of receivers indicating proximity of a communication device;
    identifying at least two selected coils from the plurality of coils by triangulating highest feedback signals; and
    initiating a communication with the communication device using the at least two selected coils, wherein initiating the communication with the communication device comprises configuring the address manager to couple the at least two selected coils through the row decoder and the column decoder.

18. An automated teller machine comprising:
    an NFC area comprising a graphical icon associated with NFC communication;
    a graphical user interface;
    a memory device storing instructions; and
    a wireless communication system located nearby the NFC area, the wireless communication system comprising:
    a plurality of coils;

a plurality of local switches coupled to at least four of the plurality of coils;
a multi-position switch directly connected to each one of the plurality of coils, wherein resistances between the plurality of coils and the multi-position switch are uniform, and wherein the multi-position switch comprises:
  a row decoder coupled to one or more of the plurality of coils through a transition impedance;
  a column decoder coupled to one or more of the plurality of coils through the transition impedance; and
  an address manager coupled to the column decoder and the row decoder;
a plurality of receivers surrounding each one of the plurality of coils; and
a processor coupled to the multi-position switch,
wherein the instructions stored in the memory device configure the processor to perform operations comprising:
  receiving feedback signals from the plurality of receivers indicating proximity of a communication device;
  identifying at least two selected coils from the plurality of coils by triangulating highest feedback signals; and
  initiating a communication with the communication device using the at least two selected coils, wherein initiating the communication with the communication device comprises configuring the address manager to couple the at least two selected coils through the row decoder and the column decoder.

* * * * *